United States Patent
Yoshizawa et al.

(10) Patent No.: US 9,316,249 B2
(45) Date of Patent: Apr. 19, 2016

(54) XY SEPARATE CRANK MECHANISM AND DRIVING DEVICE PROVIDED THEREWITH

(71) Applicants: Yasuo Yoshizawa, Yonezawa (JP); Takumi Yoshizawa, Yonezawa (JP); Yutaka Yoshizawa, Yonezawa (JP); Satoshi Yoshizawa, Yonezawa (JP)

(72) Inventors: Yasuo Yoshizawa, Yonezawa (JP); Takumi Yoshizawa, Yonezawa (JP); Yutaka Yoshizawa, Yonezawa (JP); Satoshi Yoshizawa, Yonezawa (JP)

(73) Assignees: TAC Research Inc., Yonezawa-shi (JP); NAKASHIN REISHOKU CO., LTD., Ichikikushikino-shi (JP)

( * ) Notice: Subject to any disclaimer, the term of this patent is extended or adjusted under 35 U.S.C. 154(b) by 6 days.

(21) Appl. No.: 14/060,298

(22) Filed: Oct. 22, 2013

(65) Prior Publication Data
US 2014/0041622 A1 Feb. 13, 2014

Related U.S. Application Data

(63) Continuation of application No. PCT/JP2012/056970, filed on Mar. 19, 2012.

(51) Int. Cl.
*F02B 75/24* (2006.01)
*F02B 75/32* (2006.01)
(Continued)

(52) U.S. Cl.
CPC ... *F16C 3/06* (2013.01); *F04B 9/04* (2013.01); *F04B 9/042* (2013.01); *F04B 53/006* (2013.01); *F16H 21/36* (2013.01)

(58) Field of Classification Search
CPC ............ F01B 9/023; F01B 9/026; F01B 1/08; F02B 75/32; F02B 75/246; F02B 75/28; F02B 75/24

USPC ......................................................... 123/197.4
See application file for complete search history.

(56) References Cited

U.S. PATENT DOCUMENTS 4,013,048 A * 3/1977 Reitz .............................. 123/55.7
4,598,672 A * 7/1986 Jayne et al. ................. 123/197.4
(Continued)

FOREIGN PATENT DOCUMENTS

JP 58-126135 U 8/1983
JP 59-231255 A 12/1984
(Continued)

OTHER PUBLICATIONS

International Preliminary Report on Patentability mailed Oct. 22, 2013, issued in corresponding International Application No. PCT/JP2011/059956, filed Apr. 22, 2011, 11 pages.
(Continued)

*Primary Examiner* — Marguerite McMahon
*Assistant Examiner* — Tea Holbrook
(74) *Attorney, Agent, or Firm* — Christensen O'Connor Johnson Kindness PLLC

(57) ABSTRACT

An XY separate crank mechanism provided between a movable body reciprocating in a first direction and a rotatable crankshaft to mutually convert reciprocating motion of the movable body and rotational motion of the crankshaft, includes a support member provided freely reciprocatingly in the first direction, a crank connecting member mounted on the support member freely reciprocatingly in a second direction perpendicular to the first direction and with which a crank of the crankshaft is rotatably engaged, and a connecting member configured to connect the piston and the support member and reciprocate in the first direction together with the piston and the support member.

11 Claims, 35 Drawing Sheets

(51) Int. Cl.
*F02B 75/28* (2006.01)
*F16C 3/06* (2006.01)
*F04B 9/04* (2006.01)
*F04B 53/00* (2006.01)
*F16H 21/36* (2006.01)

(56) References Cited

U.S. PATENT DOCUMENTS

| | | | | |
|---|---|---|---|---|
| 4,776,310 | A | * | 10/1988 | Gray ............................ 123/197.4 |
| 4,884,536 | A | * | 12/1989 | Neale et al. ................. 123/197.4 |
| 5,131,353 | A | * | 7/1992 | Bauer et al. ................... 123/55.5 |
| 5,836,273 | A | | 11/1998 | Hair |
| 5,873,339 | A | * | 2/1999 | Isogai ......................... 123/197.4 |
| 5,887,482 | A | * | 3/1999 | Yoshizawa ......................... 74/44 |
| 5,983,845 | A | | 11/1999 | Yanagisawa |
| 6,148,775 | A | * | 11/2000 | Farrington ................... 123/44 C |
| 2010/0180762 | A1 | * | 7/2010 | Raffaele et al. ................. 92/140 |

FOREIGN PATENT DOCUMENTS

| | | | | |
|---|---|---|---|---|
| JP | 59231255 | A | * 12/1984 | .............. F16H 21/18 |
| JP | 8-303254 | A | 11/1996 | |
| JP | 10-220547 | A | 8/1998 | |
| JP | 10-252496 | A | 9/1998 | |
| JP | 10-512937 | A | 12/1998 | |
| JP | 2004-316576 | A | 11/2004 | |
| JP | 2006-307961 | A | 11/2006 | |
| JP | 2007-270653 | A | 10/2007 | |

OTHER PUBLICATIONS

International Search Report mailed Jul. 19, 2011, issued in corresponding International Application No. PCT/JP2011/059956, filed Apr. 22, 2011, 2 pages.
International Preliminary Report on Patentability mailed Oct. 22, 2013, issued in corresponding International Application No. PCT/JP2012/056970, filed Mar. 19, 2012, 7 pages.

* cited by examiner

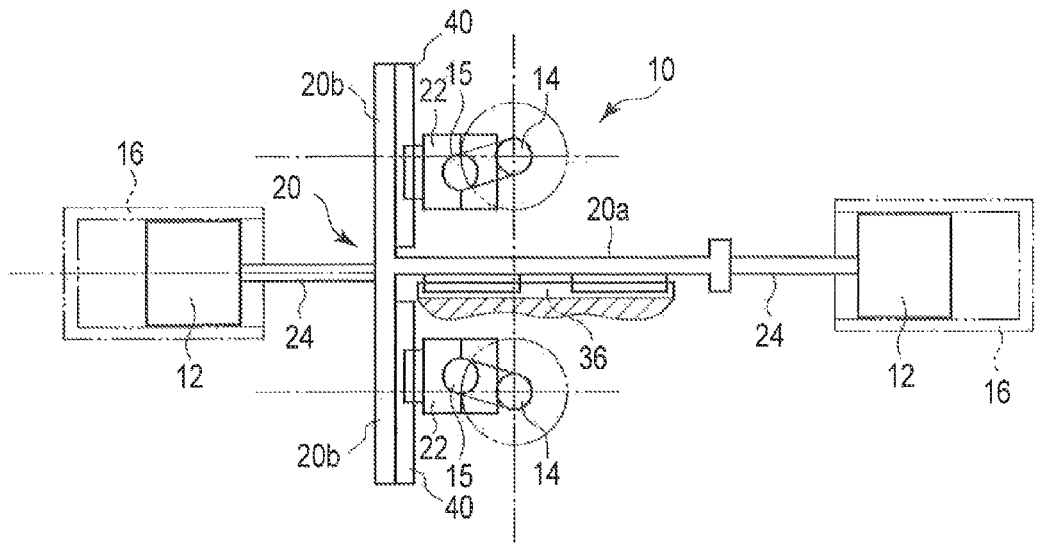
F I G. 8
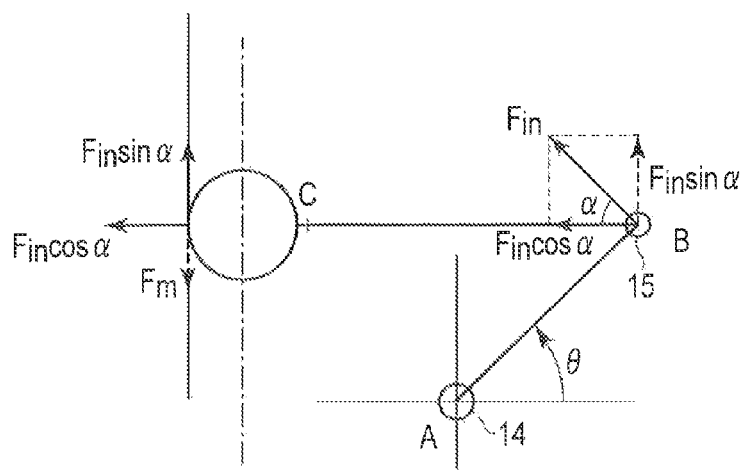
F I G. 9

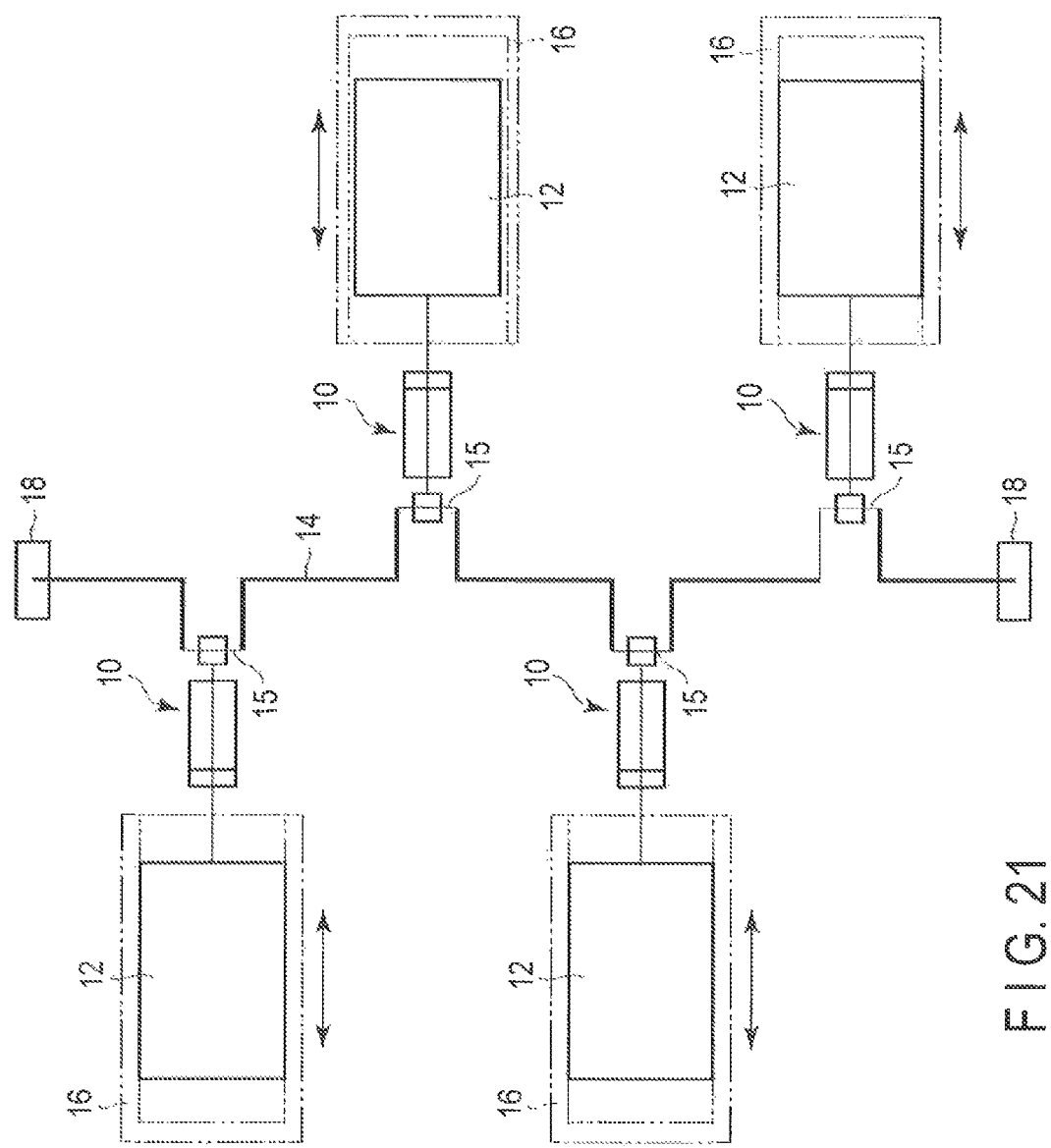
F I G. 21

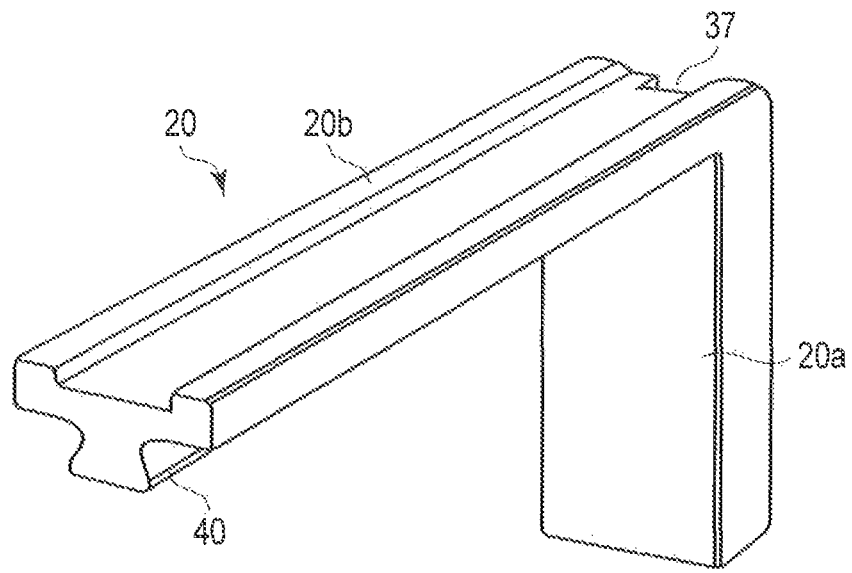
F I G. 29
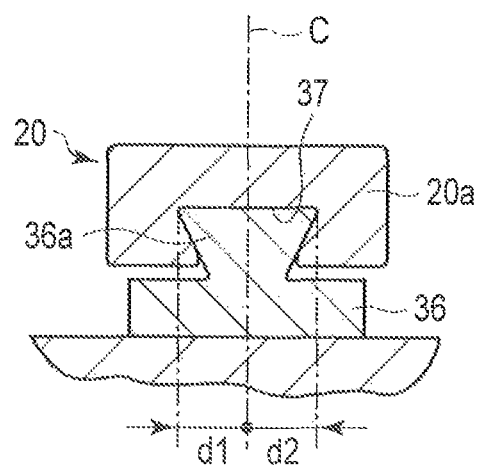
F I G. 30

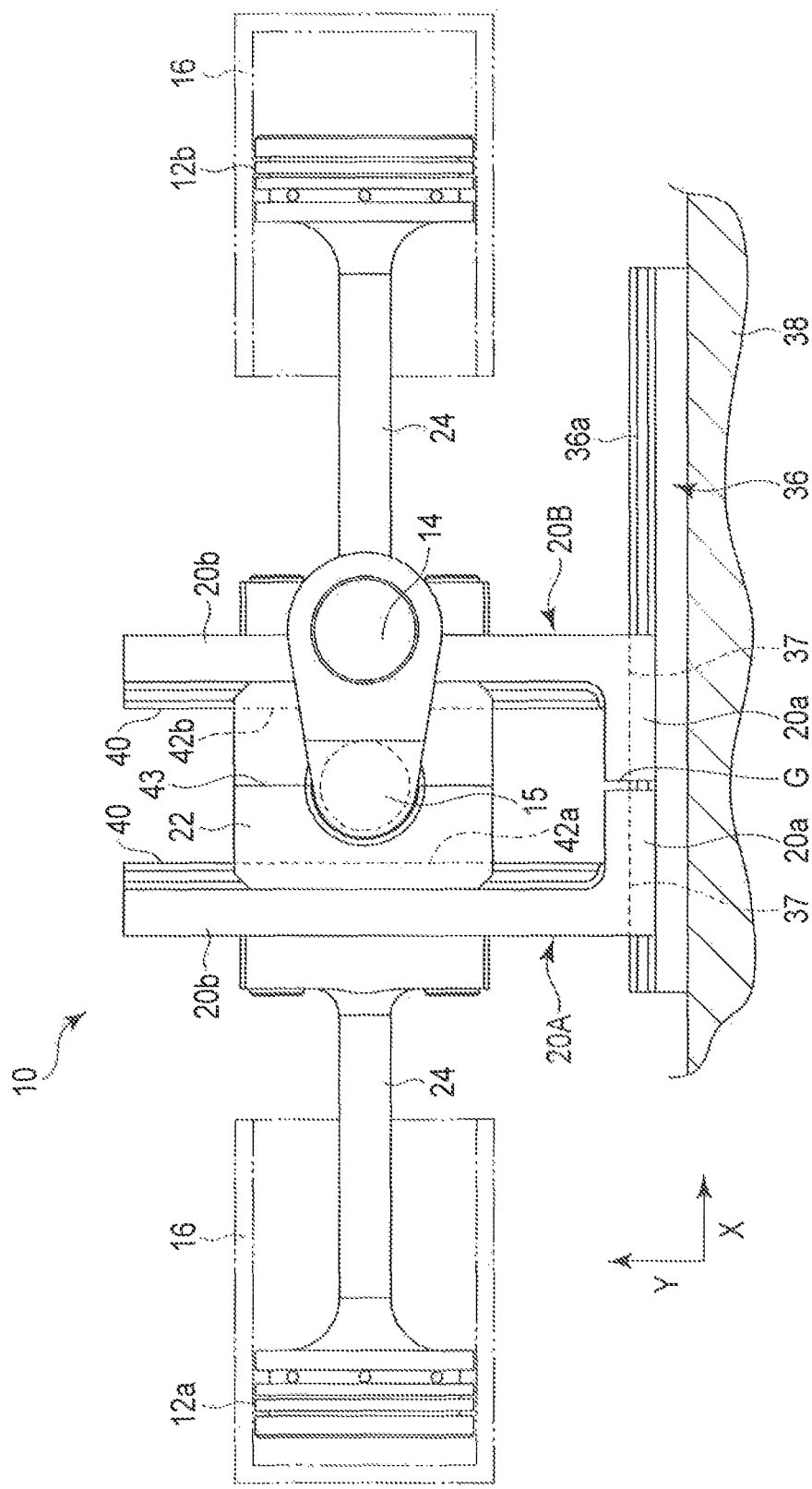
F I G. 31

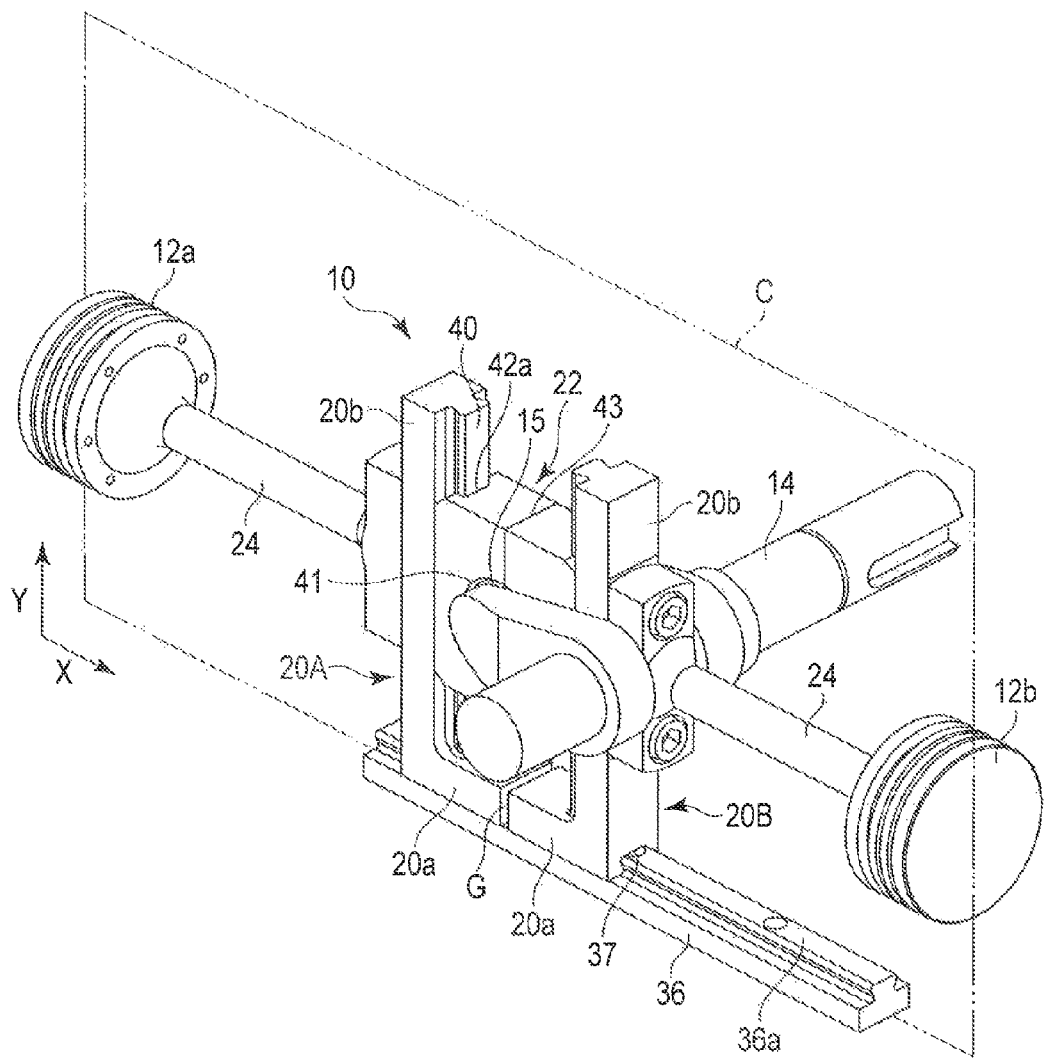
F I G. 32

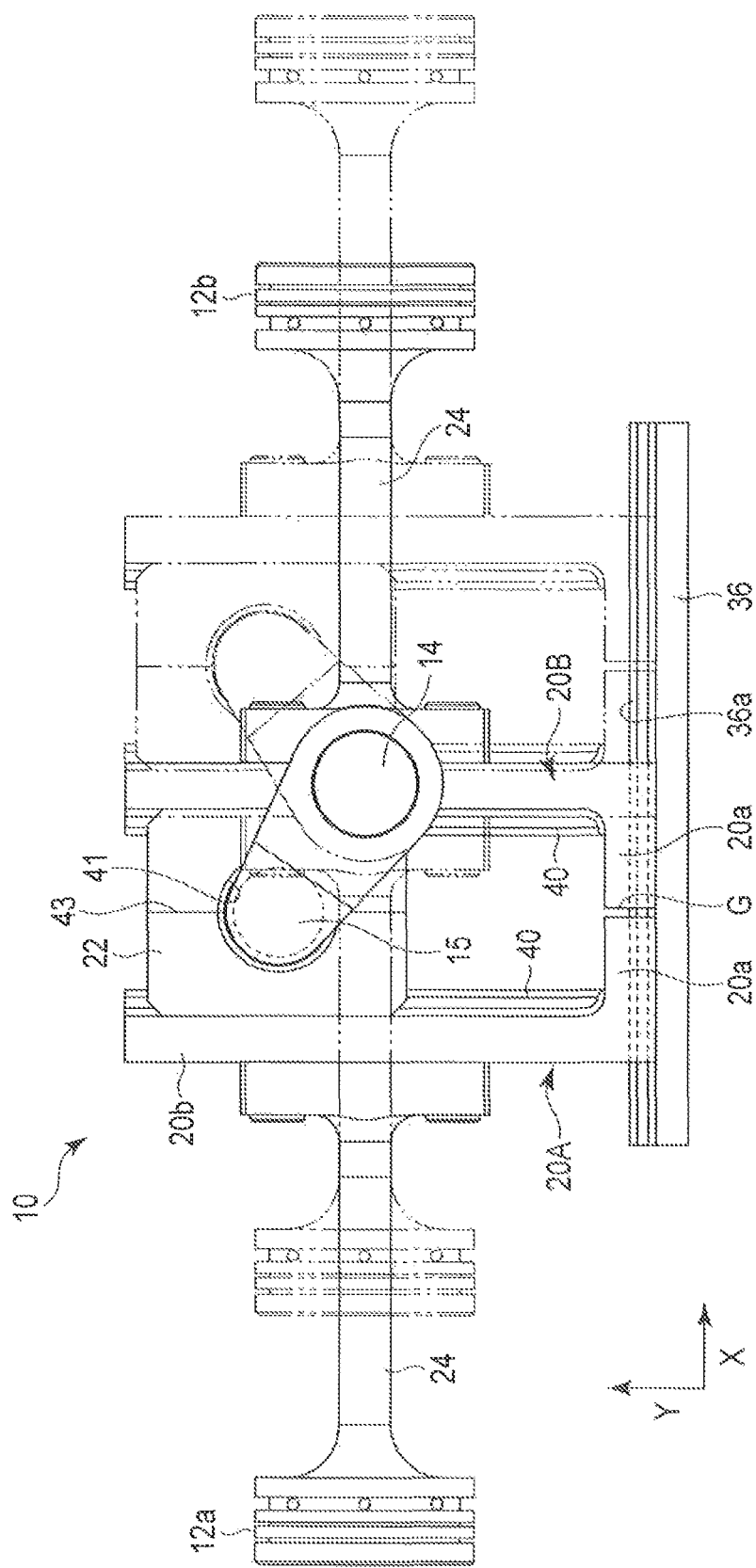
F I G. 33

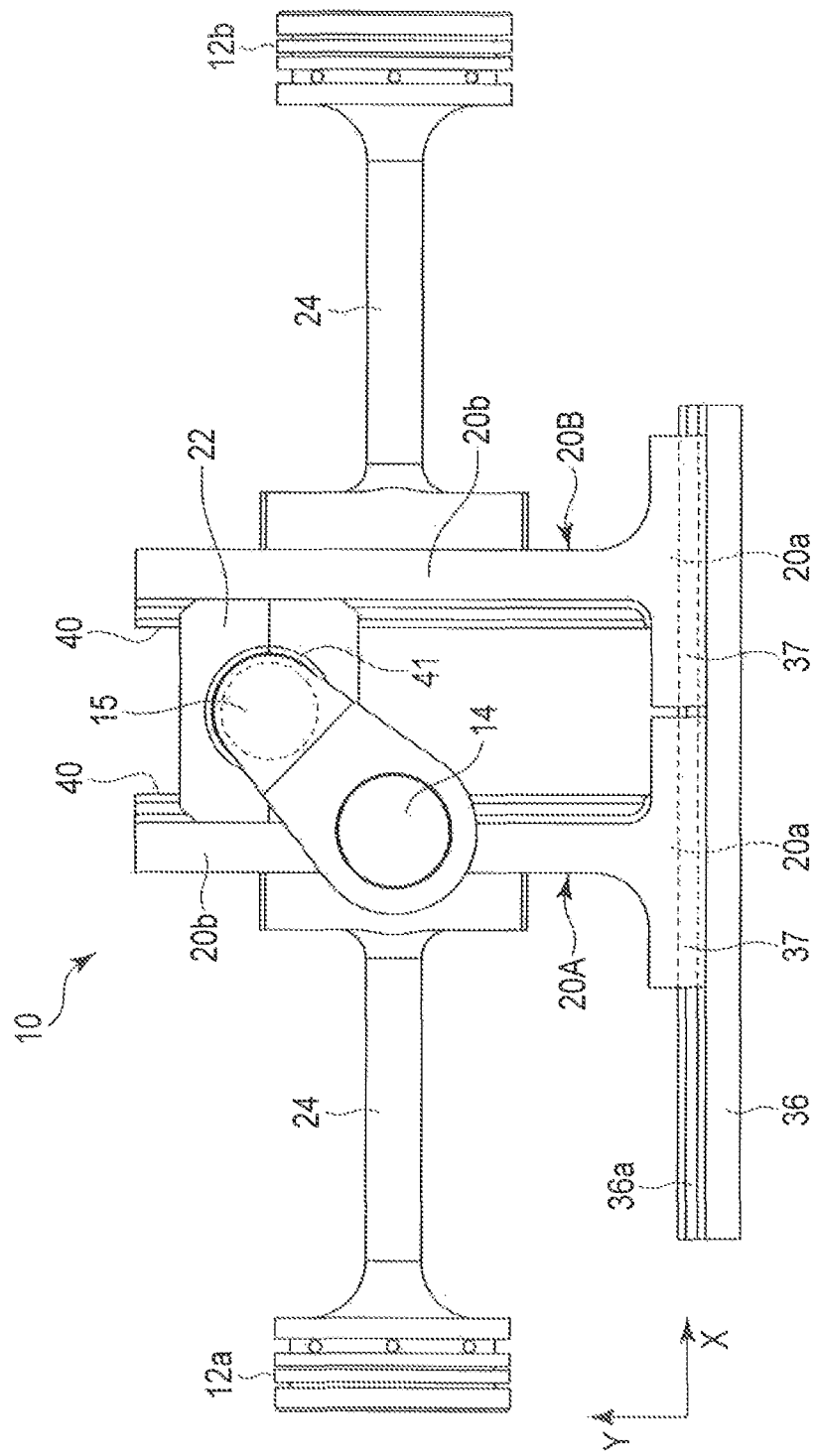
F I G. 34

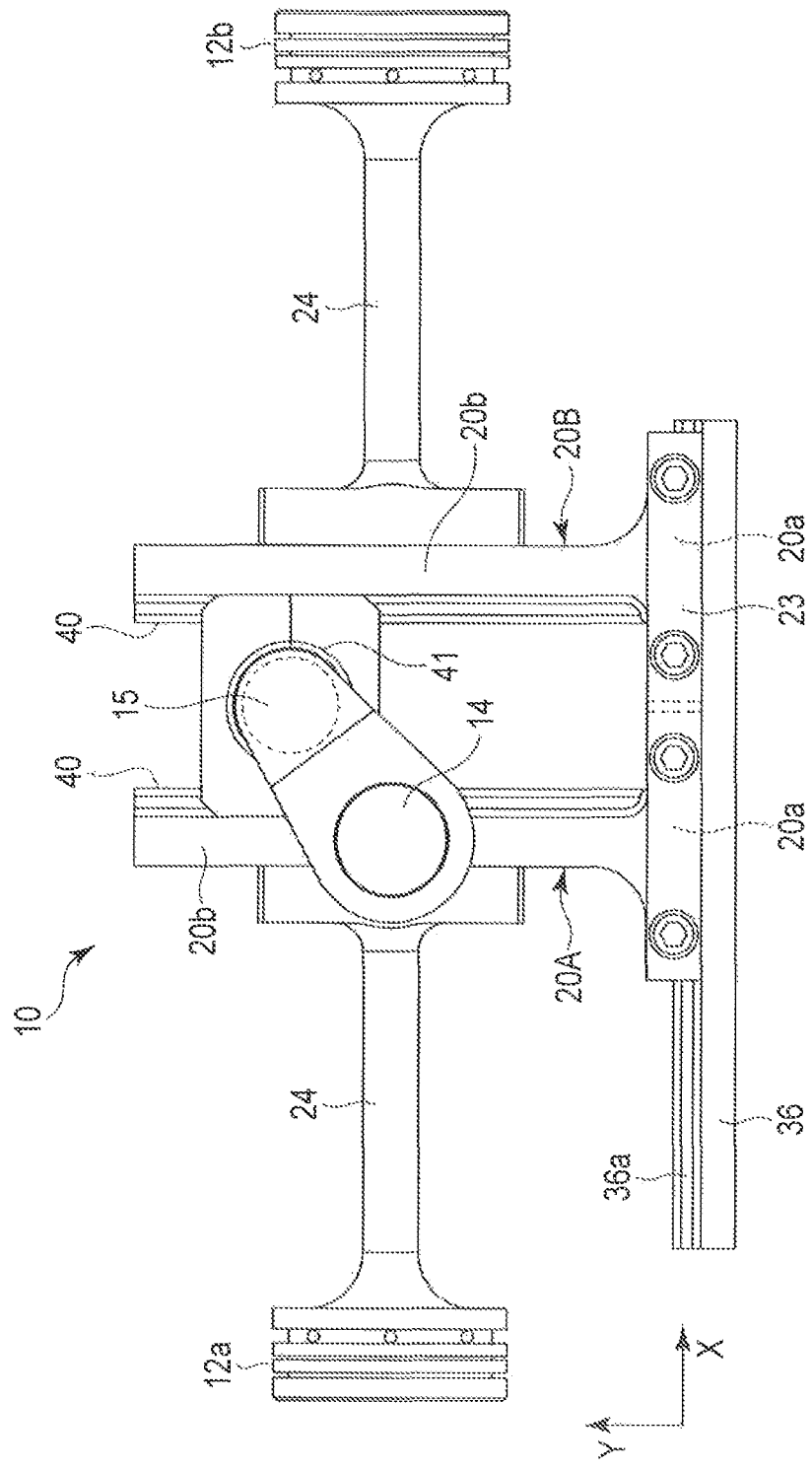
F I G. 35

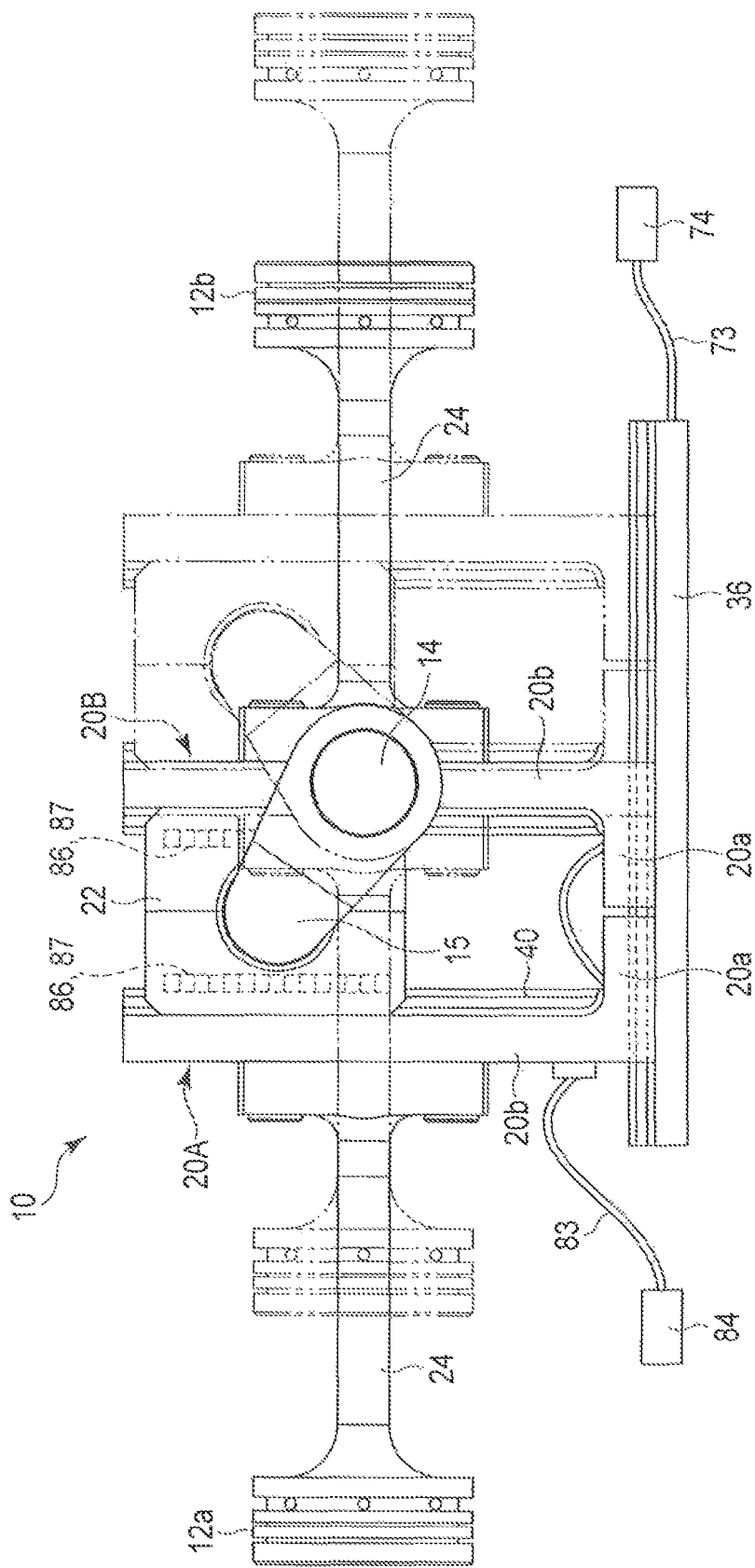
F I G. 36

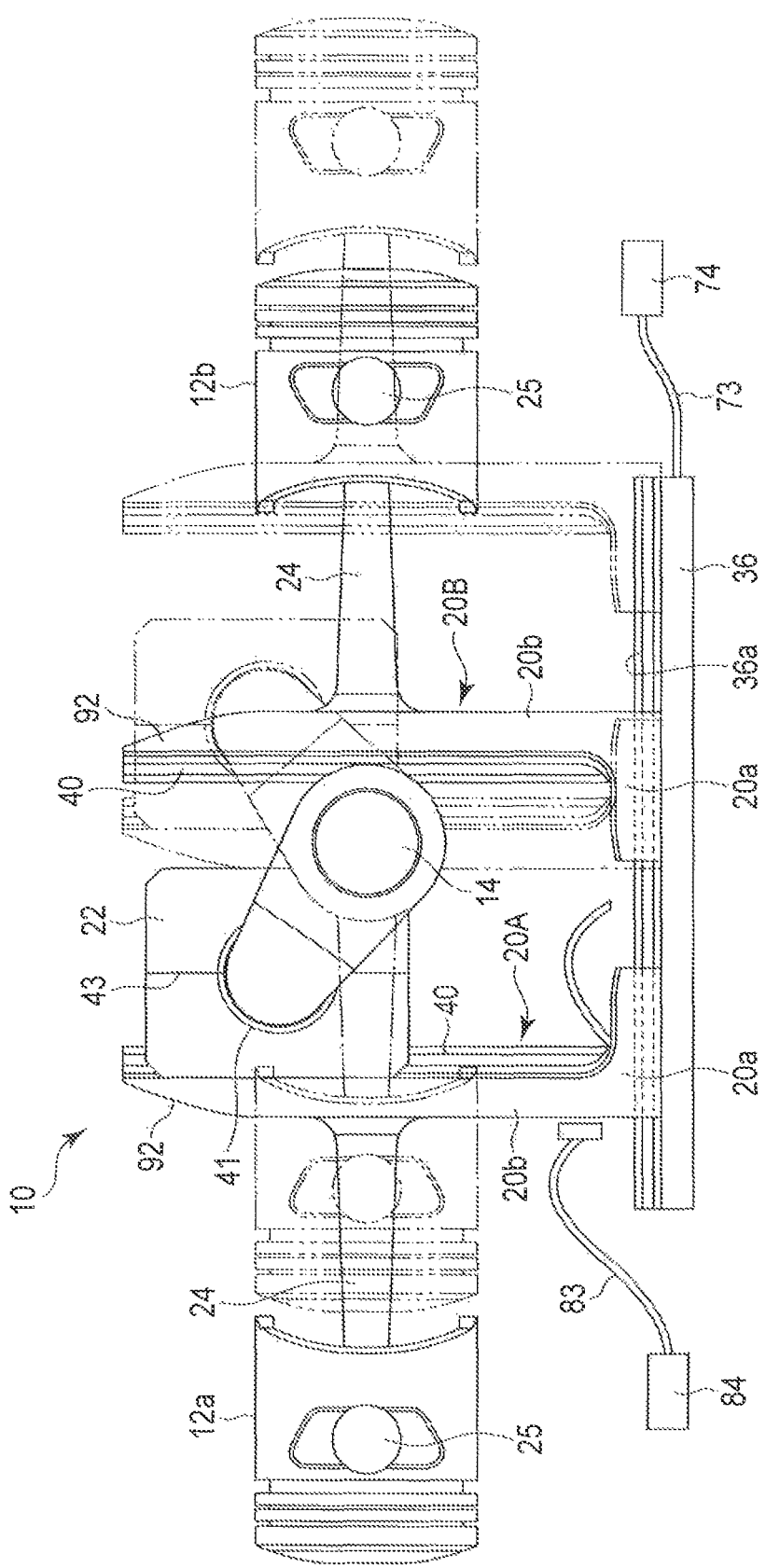
F I G. 41

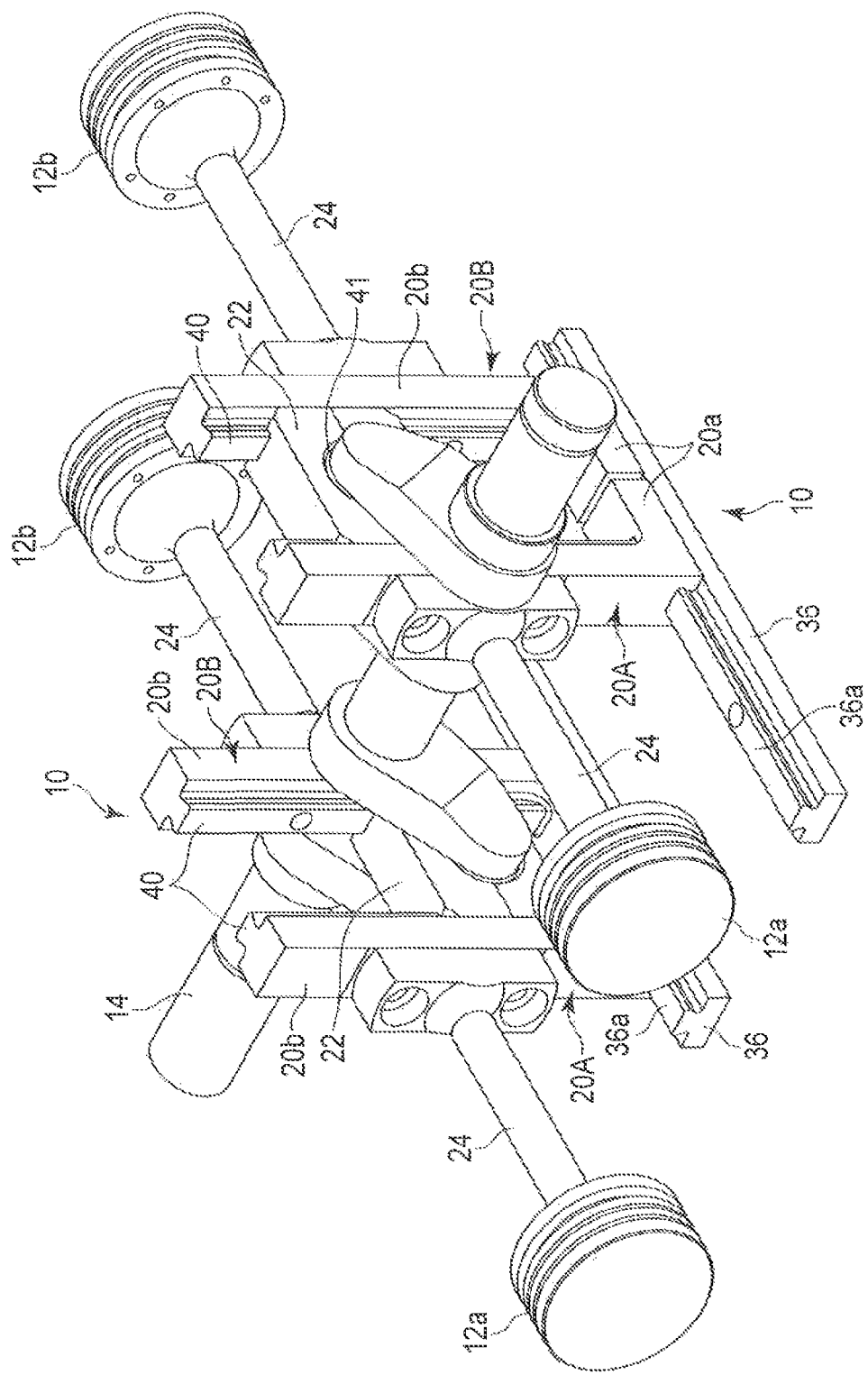
F I G. 43

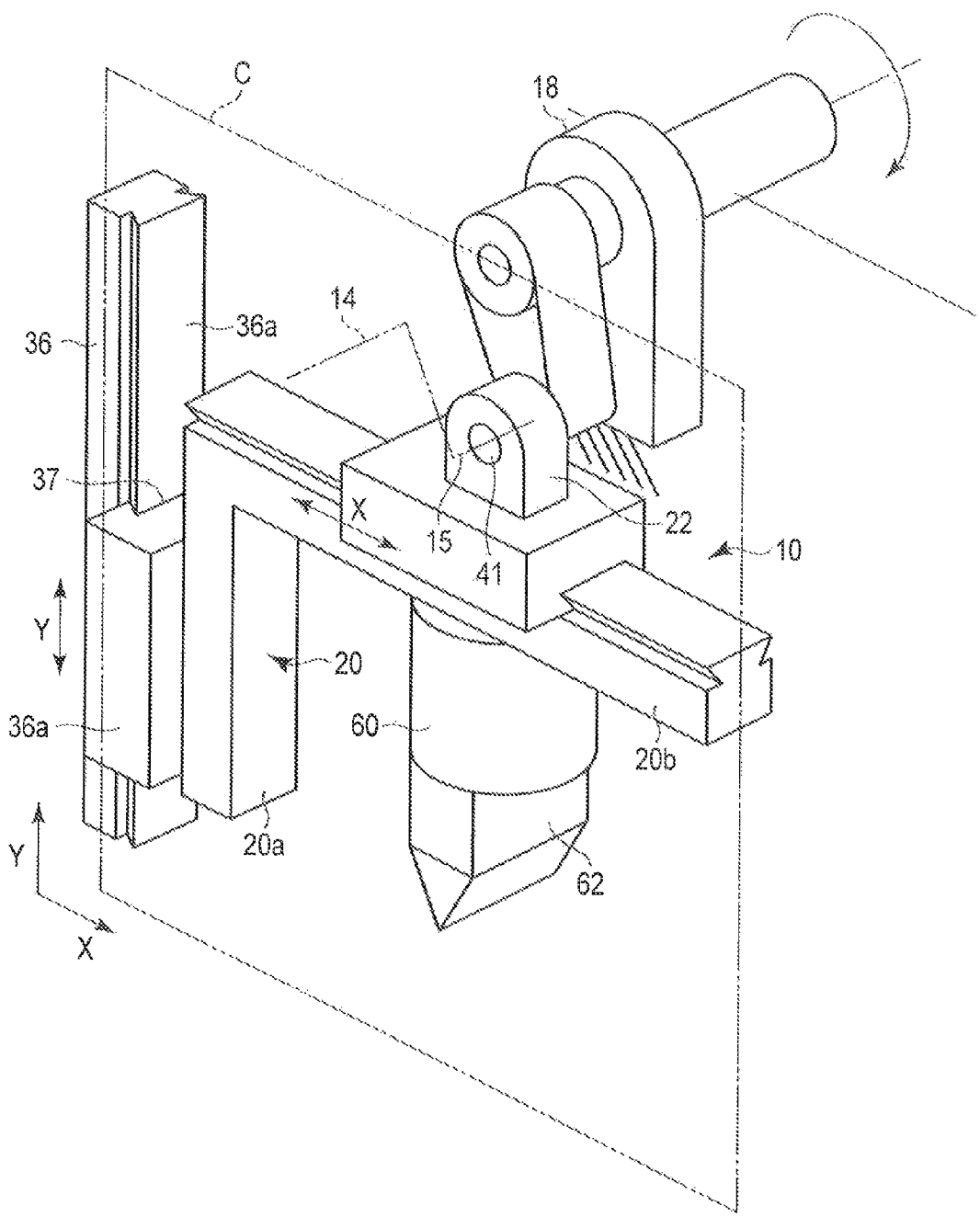
F I G. 48

XY SEPARATE CRANK MECHANISM AND DRIVING DEVICE PROVIDED THEREWITH

CROSS REFERENCE TO RELATED APPLICATIONS

This application is a Continuation application of PCT Application No. PCT/JP2012/056970, filed Mar. 19, 2012 and based upon and claiming the benefit of priority from prior International Patent Application No. PCT/JP2011/059956, filed Apr. 22, 2011, the entire contents of all of which are incorporated herein by reference.

BACKGROUND OF THE INVENTION

1. Field of the Invention

An embodiment of the present invention relates to an XY separate crank mechanism that transmits reciprocating motion by converting the reciprocating motion into rotational motion or transmits rotational motion by converting the rotational motion into reciprocating motion and a driving apparatus provided therewith.

2. Description of the Related Art

A crank mechanism is known as a mechanism that transmits reciprocating motion by converting the reciprocating motion into rotational motion. For example, engines, compressors and the like include a piston provided freely reciprocatingly inside a cylinder, a connecting rod rotatably connected to the piston, and a crankshaft extending in a direction perpendicular to the direction of reciprocating movement of the piston. The other end of the connecting rod is rotatably connected to a crank pin provided eccentrically with respect to the crankshaft. When the piston reciprocates inside the cylinder, the reciprocating motion is converted into rotational motion of the crankshaft by oscillations of the connecting rod and eccentric rotation of the crankshaft.

In the crank mechanism configured as described above, normally the connecting rod is rotatably connected to the piston via a piston pin and, when power is transmitted, is translated while oscillating about the piston pin. Thus, a force in a rotation direction acts on the piston, causing a frictional loss in a wedge effect shape on a cylinder inner surface at two locations, an outer circumferential portion at a top edge and an outer circumferential portion at a bottom edge of the piston. Normally, smooth reciprocating motion of the piston is enabled by reducing the frictional loss by using a lubricant. However, when a large piston is used, oil may run out, which manifests itself as a sticking phenomenon.

To reduce sticking by such a frictional loss, a driving mechanism provided with a cross head between the piston and connecting rod or using a short piston for a small engine has been proposed.

However, while it is possible to increase the degree of sealing of the piston by providing a cross head, a frictional loss changing every 180° is caused by a wedge effect at two locations also in the cross head. Thus, while a reciprocating motion is produced as a motion, a loss is caused by vibration derived from the reciprocating motion.

In addition, a Scotch yoke mechanism has been proposed as a mechanism to reduce the frictional loss of a piston. A typical Scotch yoke mechanism is configured to allow a movable plate to reciprocate by connecting a piston to the movable plate freely reciprocatingly supported by a pair of parallel guides, inserting a crankshaft through a guide hole formed by cutting through the movable plate, and rotating an eccentric crank provided on the crankshaft in the guide hole.

Also in the above Scotch yoke mechanism, however, a stress in a wedge effect caused by rotation of the eccentric crank acts on the pair of guides supporting the movable plate. Thus, a frictional loss is large. If, for example, a linear slider is arranged on a pair of parallel guides, one linear slider has two bearing trains and a frictional loss is caused by an umbrella opening effect, making a high-speed operation impossible.

BRIEF DESCRIPTION OF THE SEVERAL VIEWS OF THE DRAWING

FIG. 8 is a side view showing the horizontally coaxial dual-output XY separate crank mechanism according to the embodiment.

FIG. 9 is a diagram schematically showing a direction of force acting on the XY separate crank mechanism and a magnitude thereof.

FIG. 21 is a plan view showing a 4-cylinder engine unit including the XY separate crank mechanism according to the embodiment.

FIG. 29 is a perspective view showing a support member of the Z-mechanism XY separate crank mechanism according to the other embodiment.

FIG. 30 is a sectional view of a slide guide in the Z-mechanism XY separate crank mechanism according to the other embodiment.

FIG. 31 is a side view of the engine unit including a horizontally coaxial linear XY separate crank mechanism according to still another embodiment.

FIG. 32 is a perspective view of the engine unit.

FIG. 33 is a side view schematically showing an operation of the engine unit.

FIG. 34 is a side view of the engine unit including the horizontally coaxial linear XY separate crank mechanism according to another embodiment.

FIG. 35 is a side view of the engine unit including the horizontally coaxial linear XY separate crank mechanism according to the other embodiment.

FIG. 36 is a side view of the engine unit including the horizontally coaxial linear XY separate crank mechanism according to still another embodiment.

FIG. 41 is a side view of the engine unit including the horizontally coaxial linear XY separate crank mechanism according to still another embodiment.

FIG. 43 is a perspective view showing the 4-cylinder horizontal opposed-type engine unit.

FIG. 48 is a perspective view showing the XY separate crank mechanism in the pressing apparatus.

DETAILED DESCRIPTION OF THE INVENTION

Z-mechanism XY separate crank mechanisms according to embodiments and various driving apparatus provided therewith will be described below with reference to the drawings. In general, according to an embodiment, an XY separate crank mechanism provided between a movable body reciprocating in a first direction and a rotatable crankshaft to mutually convert reciprocating motion of the movable body and rotational motion of the crankshaft, comprises: a support member provided freely reciprocatingly in the first direction; a crank connecting member mounted on the support member freely reciprocatingly in a second direction perpendicular to the first direction and with which a crank of the crankshaft is rotatably engaged; and a connecting member that connects the piston and the support member and reciprocates in the first direction together with the piston and the support member.

First, the basic configuration of a Z-mechanism XY separate crank mechanism will be described.

Figure 1:
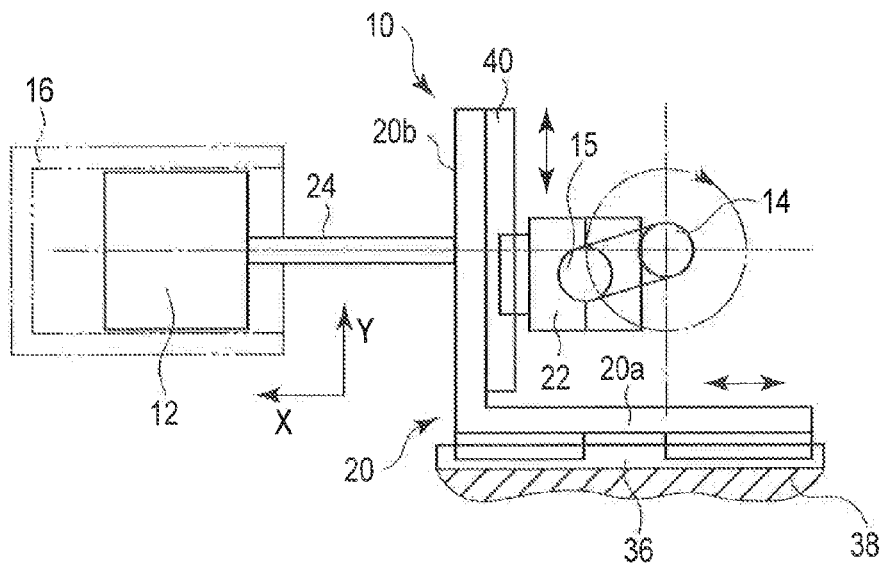
FIG. 1 is a side view showing a transverse XY separate crank mechanism according to an embodiment.
Figure 2:
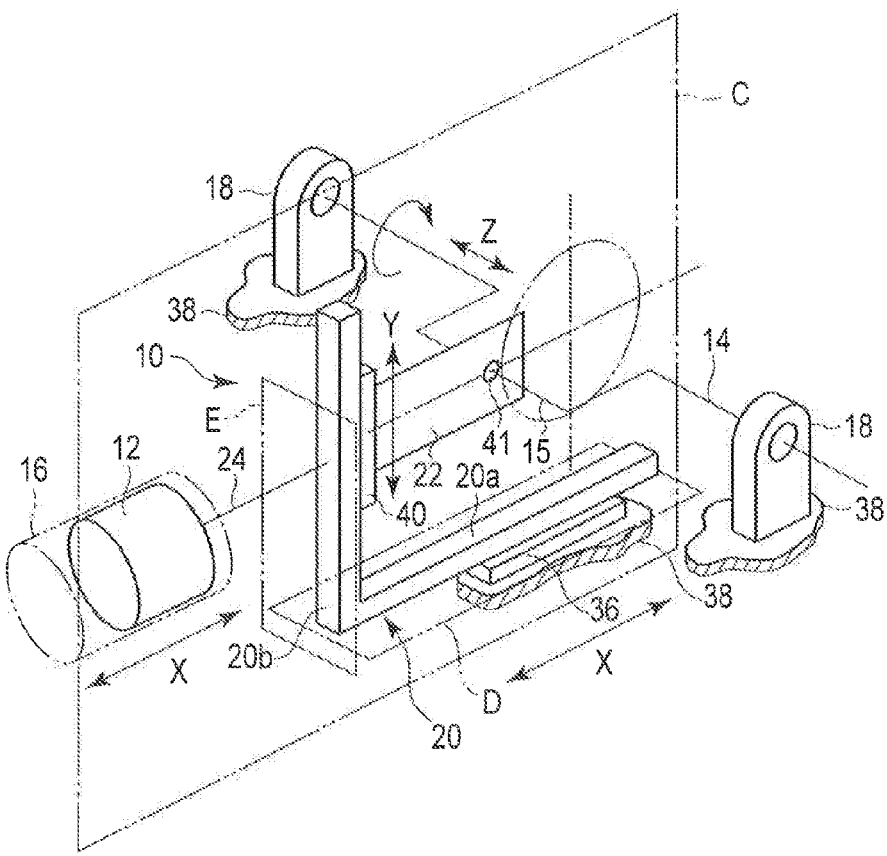
FIG. 2 is a perspective view schematically showing the transverse XY separate crank mechanism.

FIG. 1 shows a transverse Z-mechanism XY separate crank mechanism and FIG. 2 is a perspective view schematically showing the Z-mechanism XY separate crank mechanism.

As shown in FIGS. 1 and 2, a Z-mechanism XY separate crank mechanism 10 is provided between, for example, a piston 12 provided freely reciprocatingly in a first direction (X-axis direction) and a crankshaft 14 extending in a direction perpendicular to a reference plane (transmission plane) C containing a center axis (movement axis) of the piston 12 as a movable body in a driving apparatus and is configured to transmit reciprocating motion of the piston 12 in the first direction and rotational motion of the crankshaft 14 after mutually converting the motion.

The piston 12 is provided freely reciprocatingly inside a cylinder 16 and both ends of the crankshaft 14 are rotatably supported by, for example, a bearing 18. If the driving apparatus is configured as, for example, an engine, a driving force is input to the piston 12 by fuel compressed and burned inside the cylinder 16 to make reciprocating movement in the first direction. The Z-mechanism XY separate crank mechanism 10 transmits reciprocating motion of the piston 12, which is the driving input, to the crankshaft 14 after converting the reciprocating motion into rotational motion to provide rotational output to the crankshaft 14.

If the driving apparatus is configured as, for example, a compressor, a turning effort is input to the crankshaft 14 by, for example, a motor and the crankshaft 14 rotates. The Z-mechanism XY separate crank mechanism 10 transmits rotational motion of the crankshaft 14 to the piston 12 after converting the rotational motion into reciprocating motion to cause the piston 12 to reciprocate in the cylinder 16. The air inside the cylinder 16 is compressed by the reciprocating motion of the piston 12 before being supplied to the outside.

As shown in FIGS. 1 and 2, the Z-mechanism XY separate crank mechanism 10 includes a support member 20 provided freely reciprocatingly in the X-axis direction in the reference plane C, a crank connecting member 22 mounted on the support member 20 freely reciprocatingly in a second direction (Y-axis direction) perpendicular to the X-axis direction, and a connecting member 24 that connects the piston 12 and the support member 20. The movement center axis (X-axis direction) of the support member 20, the movement center axis (Y-axis direction) of the crank connecting member 22, and the movement center axis (X-axis direction) of the connecting member 24 are positioned in the reference plane C.

According to the configuration method of the Z-mechanism XY separate crank mechanism 10, the reference plane C is a plane that effectively transmits power. A transmission mechanism having a 90-degree transmission angle can be configured by mounting lubricious XY linear motion mechanisms such as linear guides 36, 40 on an X-axis plane (ground plane) D and a Y-axis plane (orthogonal transmission plane) E perpendicular to the reference plane C. By grounding one of the X-axis plane D and the Y-axis plane E, a longitudinal direction (Y-axis direction) or a transverse direction (X-axis direction) can be selected. The Z-axis direction is set as the rotation axis direction.

The support member 20 is formed, for example, in an L-shape and integrally includes a first support portion 20a extending in the X-axis direction and a second support portion 20b extending in the Y-axis direction from the first support portion. The first support portion 20a is freely reciprocatingly supported and guided in the X-axis direction by a first linear slider 36. In the present embodiment, the first linear slider 36 is fixed to a base 38 and provided fixedly. Here, the X-axis direction is set approximately as the horizontal direction and the XY separate crank mechanism 10 is configured as a so-called transverse type.

A second linear slider 40 extending in the Y-axis direction is fixed to the second support portion 20b of the support member 20. The crank connecting member 22 is formed, for example, in a plate shape and one end thereof is freely reciprocatingly supported by the second linear slider 40 in the Y-axis direction. The crank connecting member 22 is provided in the reference plane C and the other end thereof is connected to the crankshaft 14. That is, a circular bore 41 is formed at the other end of the crank connecting member 22. A crank pin 15 of the crankshaft 14 is rotatably inserted through the bore 41 via a bearing (not shown). Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12 via a piston pin (not shown), and the other end thereof is connected to the second support portion 20b of the support member 20. The connecting member 24 extends coaxially with the center axis (movement axis) of the piston 12. The connecting member 24 reciprocates integrally with the support member 20 in the X-axis direction to cause the piston 12 to reciprocate in the X-axis direction.

In a driving apparatus including the Z-mechanism XY separate crank mechanism 10 configured as described above, if, for example, the crankshaft 14 rotates clockwise after a turning effort being input to the crankshaft 14, the crank pin 15 rotates eccentrically around the crankshaft 14. The motion of the eccentric rotation is separated into movement in the X-axis direction and movement in the Y-axis direction by the crank connecting member 22 and the support member 20, the crank connecting member 22 is caused to reciprocate by the second linear slider 40 in the Y-axis direction, and the support member 20 is caused to reciprocate by the first linear slider 36 in the X-axis direction together with the crank connecting member 22. The reciprocating motion of the support member 20 in the X-axis direction is transmitted to the piston 12 via the connecting member 24 and the piston 12 reciprocates inside the cylinder 16 in the X-axis direction.

In this manner, rotational motion of the crankshaft 14 is transmitted to the piston 12 after the rotational motion being converted into reciprocating motion by the XY separate crank mechanism 10.

When the driving input is done to the piston 12, reciprocating motion of the piston 12 is similarly transmitted to the crankshaft 14 after being converted into rotational motion by the reciprocating motion of the support member 20 in the X-axis direction and the reciprocating motion of the crank connecting member 22 in the Y-axis direction in the XY separate crank mechanism 10. Accordingly, rotational output is provided to the crankshaft 14.

Figure 3:
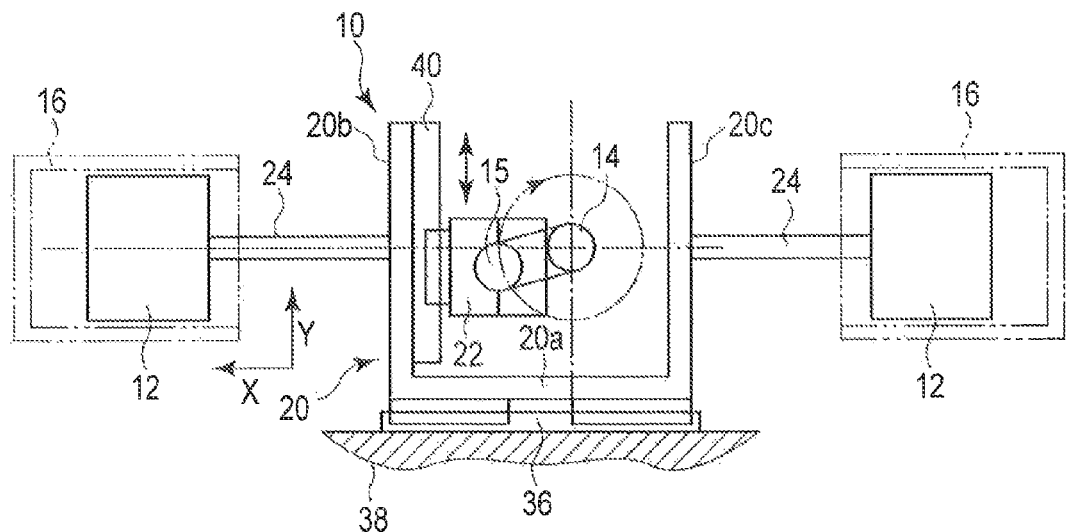
FIG. 3 is a side view showing the horizontally coaxial longitudinal XY separate crank mechanism according to the embodiment.

FIG. 3 shows a horizontally coaxial transverse Z-mechanism XY separate crank mechanism.

As shown in FIG. 3, the Z-mechanism XY separate crank mechanism 10 is provided between a pair of the pistons 12 arranged horizontally opposite to each other and freely reciprocatingly in the first direction (X-axis direction) and the crankshaft 14 extending in a direction perpendicular to the reference plane (transmission plane) C containing the center axis (movement axis) of the piston 12 as a movable body in a driving apparatus and is configured to transmit reciprocating motion of the piston 12 in the first direction and rotational motion of the crankshaft 14 after mutually converting the motion.

The support member 20 of the Z-mechanism XY separate crank mechanism 10 integrally includes the first support portion 20a extending in the X-axis direction and the second support portion 20b and a third support portion 20c extending in the Y-axis direction from both ends of the first support portion 20a in the axial direction and is formed in an approximately U-shape. The first support portion 20a is freely reciprocatingly supported and guided in the X-axis direction by the first linear slider 36. In the present embodiment, the first linear slider 36 is fixed to the base 38 and provided fixedly. Here, the X-axis direction is set approximately as the horizontal direction and the XY separate crank mechanism 10 is configured as a so-called transverse type.

The second linear slider 40 extending in the Y-axis direction is fixed to the second support portion 20b of the support member 20. The crank connecting member 22 is formed, for example, in a plate shape and one end thereof is freely reciprocatingly supported by the second linear slider 40 in the Y-axis direction. The crank connecting member 22 is provided in the reference plane C and the other end thereof is connected to the crankshaft 14. That is, the crank pin 15 of the crankshaft 14 is rotatably inserted through the other end of the crank connecting member 22 via a bearing (not shown). Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12 via a piston pin (not shown), and the other end thereof is connected to the second support portion 20b of the support member 20. The connecting member 24 extends coaxially with the center axis (movement axis) of the piston 12. The connecting member 24 reciprocates integrally with the support member 20 in the X-axis direction to cause the piston 12 to reciprocate in the X-axis direction.

The other piston 12 is connected to the third support portion 20c of the support member 20 via the connecting member 24. The connecting member 24 is configured as, for example, an elongated connecting rod, one end thereof is connected to the piston 12 via a piston pin (not shown), and the other end thereof is connected to the third support portion 20c. The connecting member 24 extends coaxially with the center axis (movement axis) of the piston 12. The connecting member 24 reciprocates integrally with the support member 20 in the X-axis direction to cause the piston 12 to reciprocate in the X-axis direction.

In a driving apparatus including the Z-mechanism XY separate crank mechanism 10 configured as described above, if, for example, the crankshaft 14 rotates clockwise after a turning effort being input to the crankshaft 14, the crank pin 15 rotates eccentrically around the crankshaft 14. The motion of the eccentric rotation is separated into movement in the X-axis direction and movement in the Y-axis direction by the crank connecting member 22 and the support member 20, the crank connecting member 22 is caused to reciprocate by the second linear slider 40 in the Y-axis direction, and the support member 20 is caused to reciprocate by the first linear slider 36 in the X-axis direction together with the crank connecting member 22. The reciprocating motion of the support member 20 in the X-axis direction is transmitted to the piston 12 via the connecting member 24 and the piston 12 reciprocates inside the cylinder 16 in the X-axis direction.

In this manner, rotational motion of the crankshaft 14 is transmitted to the piston 12 after the rotational motion being converted into reciprocating motion by the XY separate crank mechanism 10.

When the driving input is done to the piston 12, reciprocating motion of the piston 12 is similarly transmitted to the crankshaft 14 after being converted into rotational motion by the reciprocating motion of the support member 20 in the X-axis direction and the reciprocating motion of the crank connecting member 22 in the Y-axis direction in the XY separate crank mechanism 10. Accordingly, rotational output is provided to the crankshaft 14.

A driving apparatus including the Z-mechanism XY separate crank mechanism 10 configured as described above can be applied to horizontal opposed type engines, compressors, pumps and the like. Moreover, the above coaxial structure can easily realize a double-flow piston structure.

Figure 4:
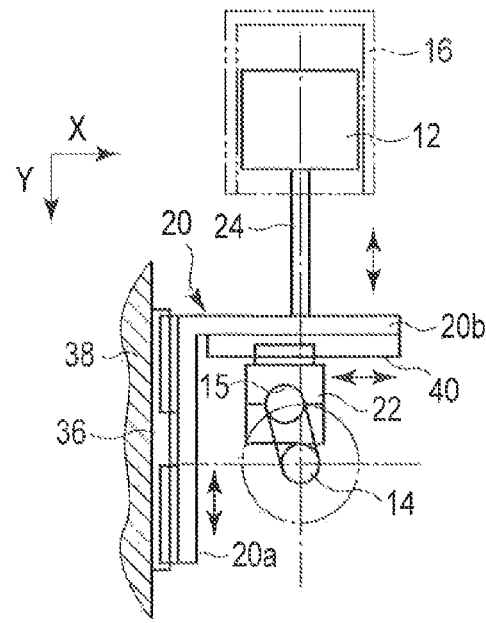
FIG. 4 is a side view showing the longitudinal XY separate crank mechanism according to the embodiment.
Figure 5:
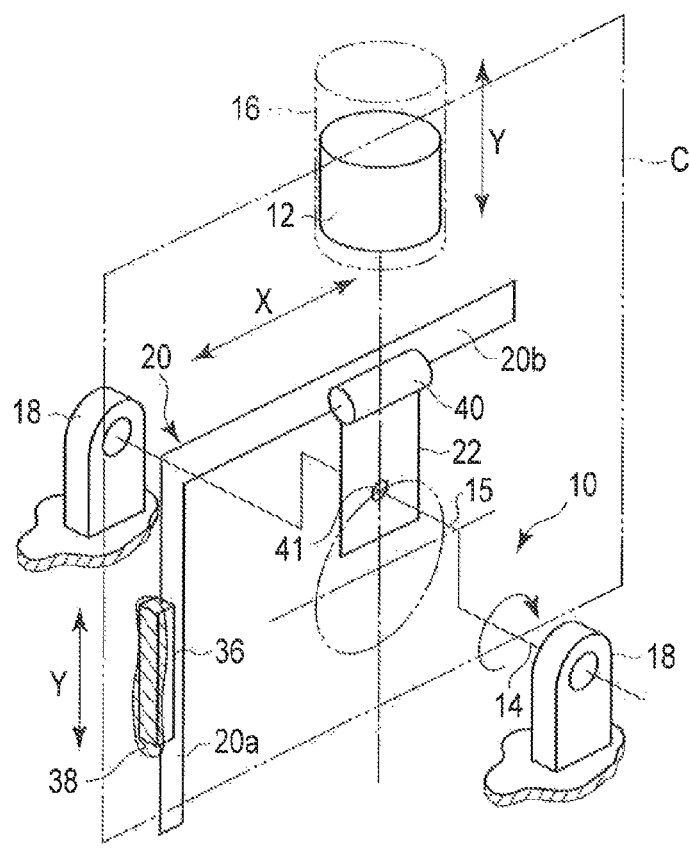
FIG. 5 is a perspective view schematically showing the longitudinal XY separate crank mechanism.

FIG. 4 shows a longitudinal Z-mechanism XY separate crank mechanism and FIG. 5 is a perspective view schematically showing the longitudinal Z-mechanism XY separate crank mechanism.

As shown in FIGS. 4 and 5, the Z-mechanism XY separate crank mechanism 10 is provided between, for example, the piston 12 provided freely reciprocatingly in the first direction (Y-axis direction) and the crankshaft 14 extending in a direction perpendicular to the reference plane C containing the center axis (movement axis) of the piston 12 in a driving apparatus and is configured to transmit reciprocating motion of the piston 12 in the first direction and rotational motion of the crankshaft 14 after mutually converting the motion.

The Z-mechanism XY separate crank mechanism 10 includes the support member 20 provided freely reciprocatingly in the Y-axis direction in the reference plane C, the crank connecting member 22 mounted on the support member 20 freely reciprocatingly in the second direction (X-axis direction) perpendicular to the Y-axis direction, and the connecting member 24 that connects the piston 12 and the support member 20.

The support member 20 is formed, for example, in an L-shape and integrally includes the first support portion 20a extending in the Y-axis direction and the second support portion 20b extending in the X-axis direction from the first support portion. The first support portion 20a is freely reciprocatingly supported and guided in the Y-axis direction by the first linear slider 36. In the present embodiment, the first linear slider 36 is fixed to the base 38 and the Y-axis plane E is grounded. Here, the Y-axis direction is set approximately as the vertical direction and the XY separate crank mechanism 10 is configured as a so-called longitudinal type.

The second linear slider 40 extending in the X-axis direction is fixed to the second support portion 20b of the support member 20. The crank connecting member 22 is formed, for example, in a plate shape and one end thereof is freely reciprocatingly supported by the second linear slider 40 in the X-axis direction. The crank connecting member 22 is provided in the reference plane C and the other end thereof is connected to the crankshaft 14. That is, the circular bore 41 is formed at the other end of the crank connecting member 22. The crank pin 15 of the crankshaft 14 is rotatably inserted through the bore 41 via a bearing (not shown). Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12 via a piston pin (not shown), and the other end thereof is connected to the second support portion 20b of the support member 20. The connecting member 24 extends coaxially with the center axis (movement axis) of the piston 12. The connecting member 24 reciprocates integrally with the support member 20 in the Y-axis direction to cause the piston 12 to reciprocate in the Y-axis direction.

Figure 6:
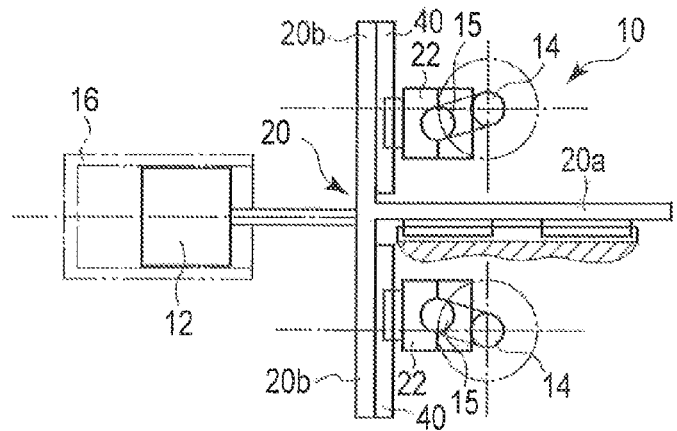
FIG. 6 is a side view showing the dual-output XY separate crank mechanism according to the embodiment.
Figure 7:
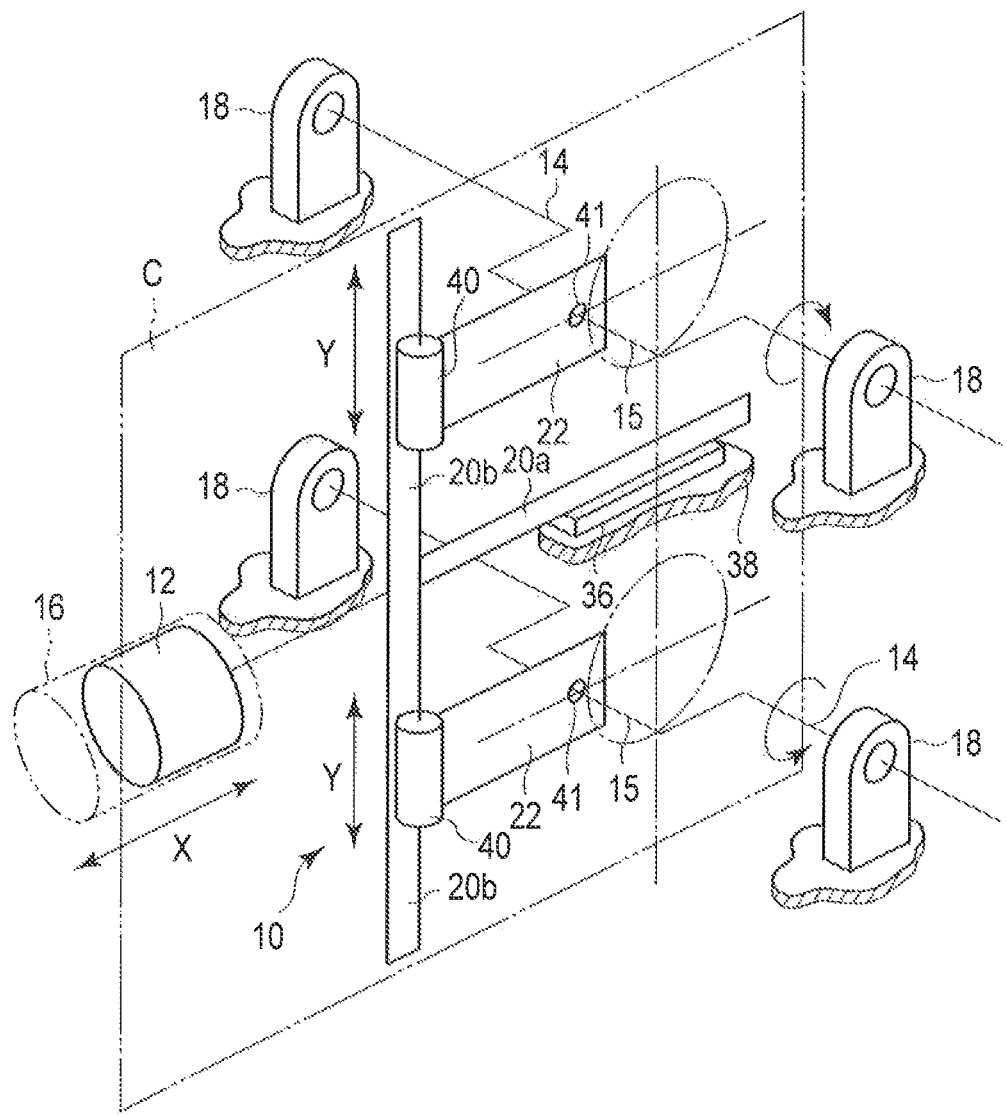
FIG. 7 is a perspective view schematically showing the dual-output XY separate crank mechanism.

FIG. 6 shows an I-type dual-output Z-mechanism XY separate crank mechanism and FIG. 7 is a perspective view schematically showing the Z-mechanism XY separate crank mechanism.

As shown in FIGS. 6 and 7, the Z-mechanism XY separate crank mechanism 10 is provided between, for example, the piston 12 provided freely reciprocatingly in the first direction (X-axis direction) and the crankshaft 14 extending in a direction perpendicular to the reference plane C containing the center axis (movement axis) of the piston 12 in a driving apparatus and is configured to transmit reciprocating motion of the piston 12 in the first direction and rotational motion of the crankshaft 14 after mutually converting the motion.

The piston 12 is provided freely reciprocatingly inside the cylinder 16 and both ends of each of the crankshafts 14 are rotatably supported by, for example, the bearing 18. If the driving apparatus is configured as, for example, an engine, a driving force is input to the piston 12 by fuel compressed and burned inside the cylinder 16 to make reciprocating movement in the first direction. The Z-mechanism XY separate crank mechanism 10 transmits reciprocating motion of the piston 12, which is the driving input, to the two crankshafts 14 after converting the reciprocating motion into rotational motion to provide rotational output to these crankshafts 14.

If the driving apparatus is configured as, for example, a compressor, a turning effort is input to the two crankshafts 14 and the crankshafts 14 rotate. The Z-mechanism XY separate crank mechanism 10 transmits rotational motion of the crankshafts 14 to the piston 12 after converting the rotational motion into reciprocating motion to cause the piston 12 to reciprocate in the cylinder 16. The air inside the cylinder 16 is compressed by the reciprocating motion of the piston 12 before being supplied to the outside.

As shown in FIGS. 6 and 7, the Z-mechanism XY separate crank mechanism 10 includes the support member 20 provided freely reciprocatingly in the X-axis direction in the reference plane C, the two crank connecting members 22 mounted on the support member 20 freely reciprocatingly in the second direction (Y-axis direction) perpendicular to the X-axis direction, and the connecting member 24 that connects the piston 12 and the support member 20.

The support member 20 is formed, for example, in a T-shape and integrally includes the first support portion 20a extending in the X-axis direction and the two second support portion 20b extending up and down in the Y-axis direction from the first support portion. The first support portion 20a is freely reciprocatingly supported and guided in the X-axis direction by the first linear slider 36. In the present embodiment, the first linear slider 36 is fixed to the base 38 and provided fixedly. Here, the X-axis direction is set approximately as the horizontal direction and the XY separate crank mechanism 10 is configured as a so-called transverse type.

The second linear slider 40 extending in the Y-axis direction is fixed to each of the second support portions 20b of the support member 20. The two crank connecting members 22 are formed as, for example, in a plate shape and disposed on both sides of the first support portion 20a in the Y-axis direction. One end of each of the crank connecting members 22 is freely reciprocatingly supported by the second linear slider 40 in the Y-axis direction. Each of the crank connecting members 22 is provided in the reference plane C and the other end thereof is connected to the crankshaft 14. That is, the circular bore 41 is formed at the other end of the crank connecting member 22. The crank pin 15 of the crankshaft 14 is rotatably inserted through the bore 41 via a bearing (not shown). Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12 via a piston pin (not shown), and the other end thereof is connected to the second support portion 20b of the support member 20. The connecting member 24 extends coaxially with the center axis (movement axis) of the piston 12. Here, the connecting member 24 is provided coaxially with the first support portion 20a of the support member 20. The connecting member 24 reciprocates integrally with the support member 20 in the X-axis direction to cause the piston 12 to reciprocate in the X-axis direction.

In a driving apparatus configured as described above, if, for example, one of the crankshafts 14 rotates clockwise and the other crankshaft 14 rotates counterclockwise after a turning effort being input to the two crankshafts 14, the crank pins 15 rotate eccentrically around the respective crankshafts 14. The motion of the eccentric rotation is separated into movement in the X-axis direction and movement in the Y-axis direction by the crank connecting members 22 and the support member 20, each of the crank connecting members 22 is caused to reciprocate by the second linear slider 40 in the Y-axis direction, and the support member 20 is caused to reciprocate by the first linear slider 36 in the X-axis direction together with the crank connecting members 22. The reciprocating motion of the support member 20 in the X-axis direction is transmitted to the piston 12 via the connecting member 24 and the piston 12 reciprocates inside the cylinder 16 in the X-axis direction.

In this manner, rotational motion of the two crankshafts 14 is transmitted to the piston 12 after the rotational motion being converted into reciprocating motion by the XY separate crank mechanism 10.

When the driving input is done to the piston 12, reciprocating motion of the piston 12 is similarly transmitted to the two crankshafts 14 after being converted into rotational motion by the reciprocating motion of the support member 20 in the X-axis direction and the reciprocating motion of the crank connecting members 22 in the Y-axis direction in the XY separate crank mechanism 10. Accordingly, rotational output is provided to the two crankshafts 14.

A driving apparatus including the above dual-output Z-mechanism XY separate crank mechanism is suitable for a large marine engine or a jet engine. If, for example, the driving apparatus is applied as a marine engine, rotational output of the two crankshafts 14 is transmitted to two screws so that simultaneous counter rotating screws or coaxial counter rotating screws can be realized. In this case, output superior in synchronism without deviation regarding the two screws can be obtained by using the XY separate crank mechanism.

FIG. 8 shows a horizontally coaxial dual-output Z-mechanism XY separate crank mechanism.

As shown in FIG. 8, the Z-mechanism XY separate crank mechanism 10 is provided between, for example, a pair of the pistons 12 each provided freely reciprocatingly in the first direction (X-axis direction) and the two crankshafts 14 extending in a direction perpendicular to the reference plane C containing the center axis (movement axis) of these pistons 12 in a driving apparatus and is configured to transmit reciprocating motion of the pistons 12 in the first direction and rotational motion of the two crankshafts 14 after mutually converting the motion.

The Z-mechanism XY separate crank mechanism 10 is configured in the same manner as the I-type dual-output Z-mechanism XY separate crank mechanism and includes the support member 20 provided freely reciprocatingly in the X-axis direction in the reference plane C, the two crank connecting members 22 mounted on the support member 20 freely reciprocatingly in the second direction (Y-axis direction) perpendicular to the X-axis direction, and the connecting member 24 that connects the piston 12 and the support member 20. Further, the XY separate crank mechanism 10 includes the connecting member 24 connecting the other piston and the other end of the support member 20. The connecting member 24 is configured as an elongated connecting rod, one end thereof is connected to the piston 12 via a piston pin (not shown), and the other end thereof is connected to the first support portion 20a of the support member 20. The connecting member 24 extends coaxially with the center axis (movement axis) of the piston 12. Here, the connecting member 24 is provided coaxially with the first support portion 20a of the support member 20. The connecting member 24 reciprocates integrally with the support member 20 in the X-axis direction to cause the piston 12 to reciprocate in the X-axis direction.

The other configuration is the same as that of the I-type dual-output Z-mechanism XY separate crank mechanism 10.

According to the Z-mechanism XY separate crank mechanism 10 in the various embodiments configured as described above, when compared with a mechanism using an oscillating connecting rod or a slider crank, no side thrust loss (frictional loss) occurs and an occurrence of vibration can also be reduced. Moreover, because no side thrust loss occurs, when compared with a slider crank mechanism, transmission efficiency can be improved by 30% to 40%.

Frictional losses of the XY separate crank mechanism 10 and a conventional crank mechanism according to a comparative example will be calculated and compared.

Figure 10:
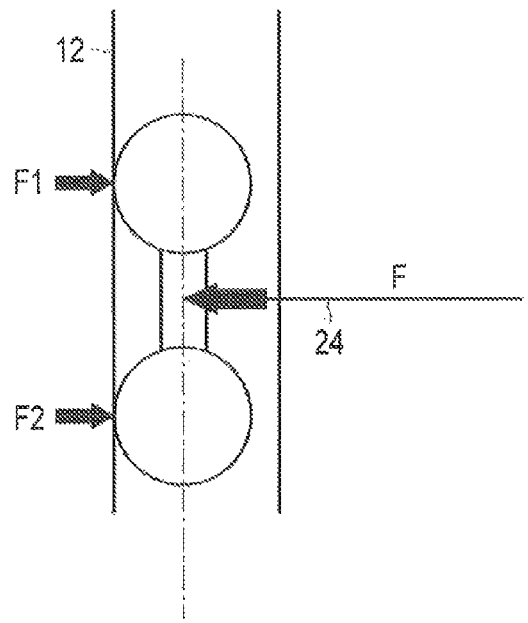
FIG. 10 is a diagram showing an interaction force between the separation crank mechanism and a piston as a 2-sphere structure.

FIG. 9 illustrates an action force acting on an XY separate crank mechanism according to the present embodiment and FIG. 10 schematically shows action force points between the XY separate crank mechanism and a piston as two spheres.

For a 2-sphere structure, as shown in FIG. 10, when, for example, a force F is applied from the connecting member 24 to the piston 12, the force is separated into two forces $F_1$, $F_2$, but $F_1$ and $F_2$ are equal and thus, the two spheres may be analyzed, as shown in FIG. 9, as a sphere.

$$F=F_1+F_2, F_1=F_2$$

If, in FIG. 9,

AB: Crank, BC: Crank connecting member,
point A: Crank axis rotation center,
point B: Crank pin 15, $F_{in}$: Force input to point B,
θ: Angle formed by a crank arm at point A, α: Angle formed by $F_{in}$ at point B,
are set, a component force $F_{in} \cdot \cos \alpha$ in the X direction of $F_{in}$ input to point B is also generated on one sphere at point C in the same manner by the crank BC, which is a rigid body. Similarly, a component force $F_{in} \cdot \sin \alpha$ in the Y-axis direction at point B is also generated on one sphere at point C. Accordingly, a frictional loss $F_m$ generated at point C is given by the formula below.

[Math 1]

$$F_m = \mu_m F_{in} \sin \alpha \qquad (1)$$
$$= \mu_m \cdot F_{in} \sin\left(\frac{\pi}{2} - \theta\right)$$

$\mu_m$: Coefficient of dynamic friction at point C)
If θ=45°, $\mu_m$=0.01, $F_{in}$=1[N]=45°

$$F_m = 0.01 \times 1 \times \sin 45°$$
$$= 0.0007[N]$$

That is, the output $F_{out}$ in the Y-axis direction is given by $$F_{out} = F_{in} \cdot \sin \alpha - \mu_m \cdot \sin \alpha$$
$$= 0.9993[N]$$

Thus, $F_{out}$ is output in the Y-axis direction with transmission efficiency of 99.93%.

Figure 11:
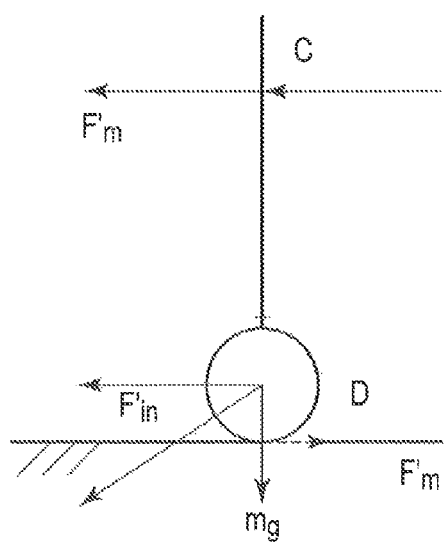
FIG. 11 is a diagram schematically showing an action force in a Y-axis direction of the piston.

Next, as shown in FIG. 11, a force generated at point C in the X-axis direction is set as $F'_{in}$. CD is a rigid body and $F'_{in}$ at point C can directly be moved to point D, which allows a representation as in FIG. 9. Since $F'_{in}$ is a frictional force at point D, $$F'_m = \mu'_m \times F'_{in} \qquad (2)$$

($\mu'_m$: Coefficient of dynamic friction at point D)
$F'_{in}$ is a force in the X-axis direction at point C shown in FIG. 3.
Thus, from $F'_{in} = F_{in} \cdot \cos \alpha$, $$F'_m = \mu'_m \times F_{in} \cdot \cos \alpha \qquad (3)$$

(α=π/2−θ)
is obtained from Formula (2).
If $F_{in}$=1 [N], $\mu_m$=0.01, and θ=45°, $$F'_m = 0.01 \times 1 \times \cos 45°$$
$$= 0.01[N] \qquad (4)$$

is obtained.

From Formula (4), the transmission of force in the X-axis direction is given by $$F'_{in} - F'_m = 1 - 0.01 = 0.99$$

which shows that transmissibility of 99% is achieved by causing almost no loss.

Figure 12:
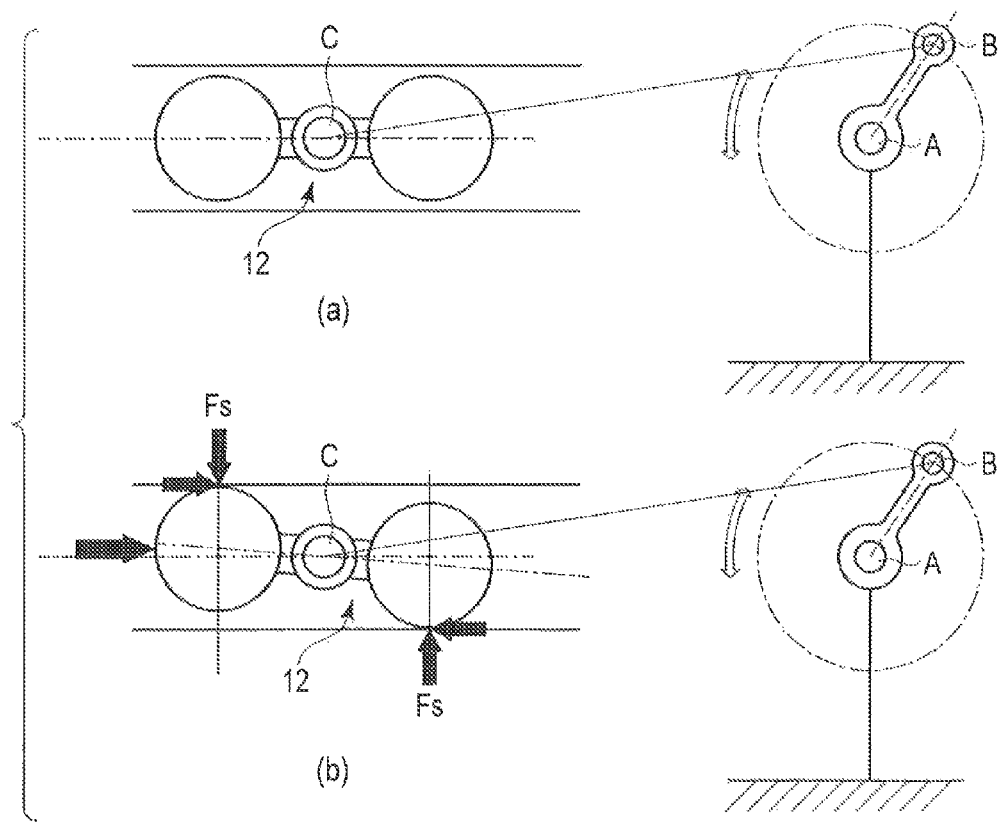
FIG. 12 is a diagram schematically showing a crank mechanism according to a comparative example and the direction of force acting thereon and the magnitude thereof.
Figure 13:
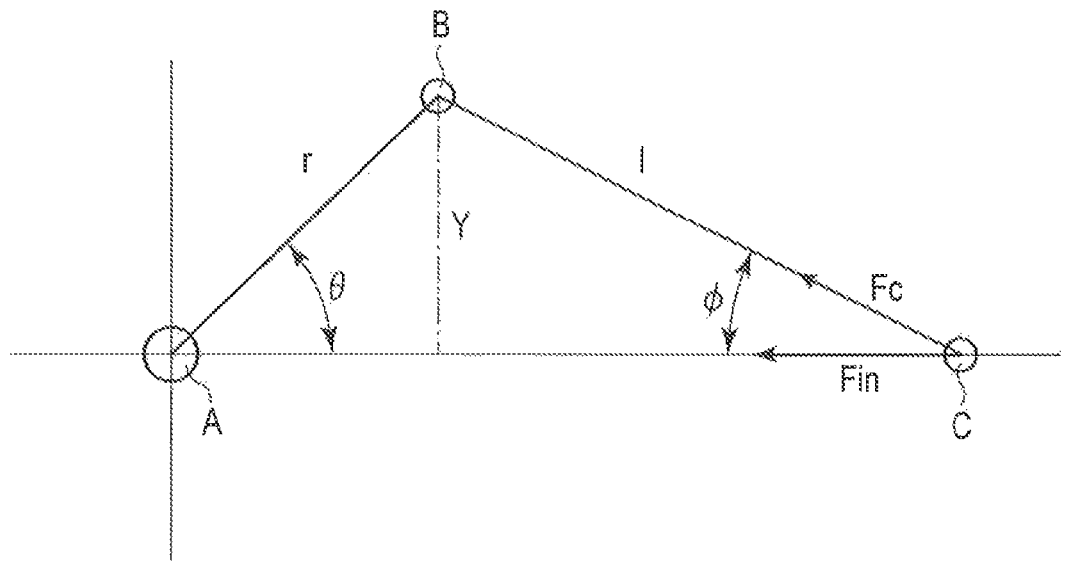
FIG. 13 is a diagram schematically showing the direction of force acting on the crank mechanism according to the comparative example and the magnitude thereof.
Figure 14:
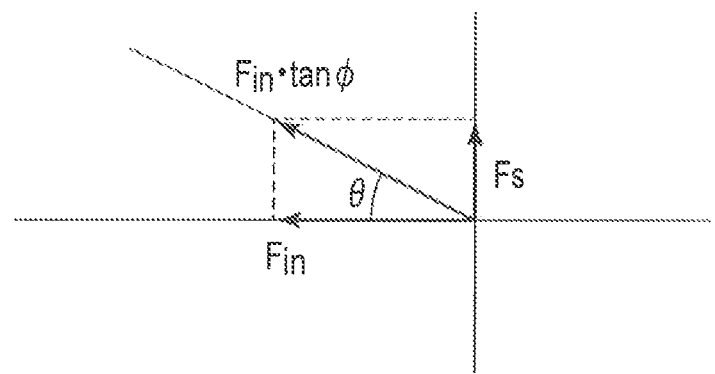
FIG. 14 is a diagram schematically showing the direction of force acting on the crank mechanism according to the comparative example and the magnitude thereof.

In contrast, as a comparative example, FIGS. 12, 13, and 14 schematically show a conventional crank mechanism using an oscillating connecting rod. If, in these diagrams, AB: Crank, BC: Connecting rod, point A: Crank axis rotation center,
point B: Crank pin 15, point C: Piston pin, 12: Piston indicated by two spheres,
$F_{in}$: Force input to point C, θ: ∠BAC, φ: ∠BCA are set,
a force of $F_{in}$ is applied to point C. A force of $F_{in} \cdot \tan \phi$ is generated on the connecting rod BC by the input $F_{in}$.

$$F_c = F_{in} \cdot \tan \phi \qquad (5)$$

Next, if AB=r and BC=l,
from FIG. 13

$$Y = l \cdot \sin \phi = r \cdot \sin \theta, \sin \phi = r/l \cdot \sin \theta \qquad (6)$$

are obtained to represent ∠BCA=f by a crank angle θ.
From $\sin^2 \phi + \cos^2 \phi = 1$,

[Math 2]

$$\left(\frac{\ell}{r} \sin\phi\right)^2 + \cos^2\phi = 1 \qquad (7)$$

$$\therefore \cos\phi = \sqrt{1 - \left(\frac{\ell}{r}\sin\theta\right)^2}$$

is obtained.
From Formulas (5) to (7),

[Math 3]

$$F_C = F_{in} \cdot \tan\phi = F_{in} \cdot \frac{\sin\phi}{\cos\phi} \qquad (8)$$

$$\therefore F_C = \frac{F_{in} \cdot \frac{\ell}{r} \cdot \sin\theta}{\sqrt{1 - \left(\frac{\ell}{r} \cdot \sin\theta\right)^2}}$$

As shown in FIG. 14, a side thrust $F_s$ at point C is given by $$F_s = F_c \cdot \sin \phi, F_s = F_c \cdot l/r \cdot \sin \theta \qquad (9)$$

From Formulas (8) and (9),

[Math 4]

$$F_S = \left\{\frac{F_{in} \cdot \frac{\ell}{r} \cdot \sin\theta}{\sqrt{1 - \left(\frac{\ell}{r} \cdot \sin\theta\right)^2}}\right\} \cdot \frac{\ell}{r} \cdot \sin\theta \qquad (10)$$

$$= \frac{F_{in}\left(\frac{\ell}{r} \cdot \sin\theta\right)^2}{\sqrt{1 - \left(\frac{\ell}{r} \cdot \sin\theta\right)^2}}$$

Figure 15:
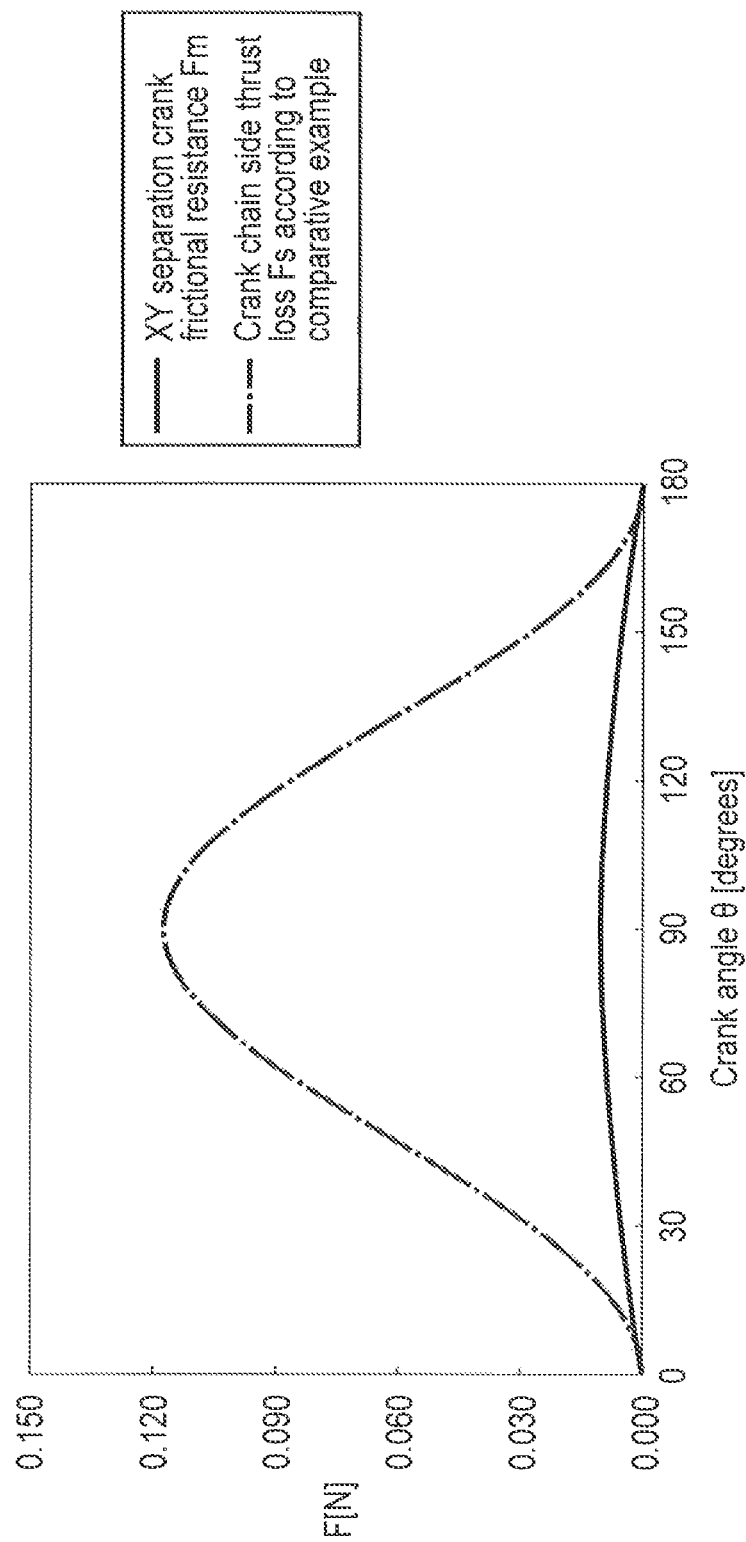
FIG. 15 is a diagram comparing and showing generated frictional resistance of the XY separate crank mechanism according to the embodiment and the crank mechanism according to the comparative example.
Figure 16:
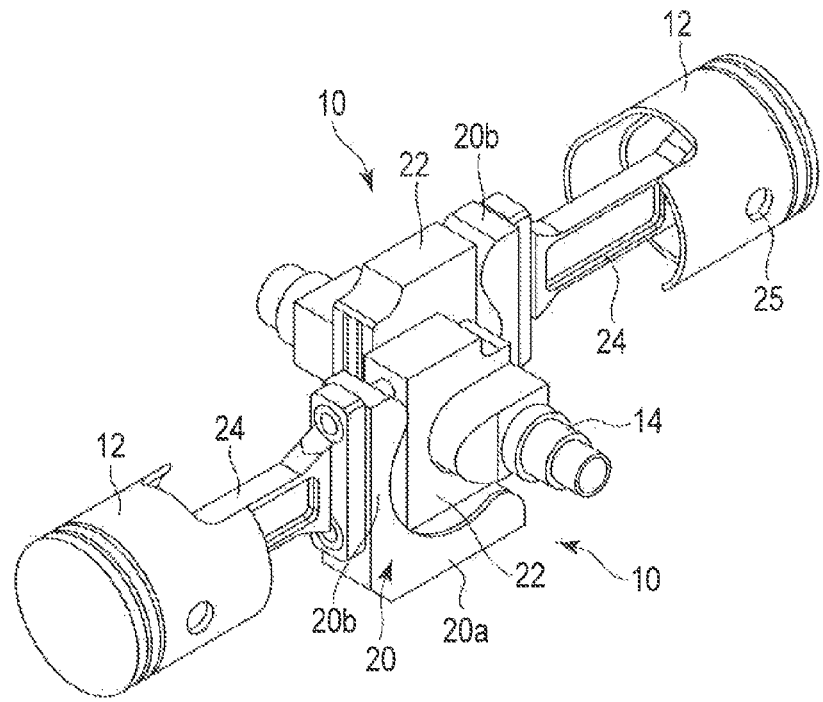
FIG. 16 is a perspective view showing an engine unit including the XY separate crank mechanism according to the embodiment.
Figure 17:
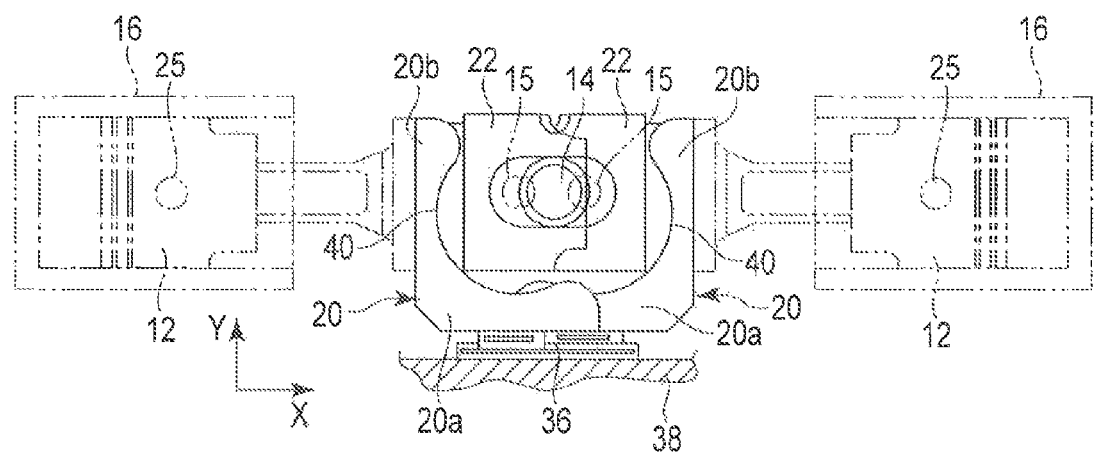
FIG. 17 is a side view of the engine unit.
Figure 18:
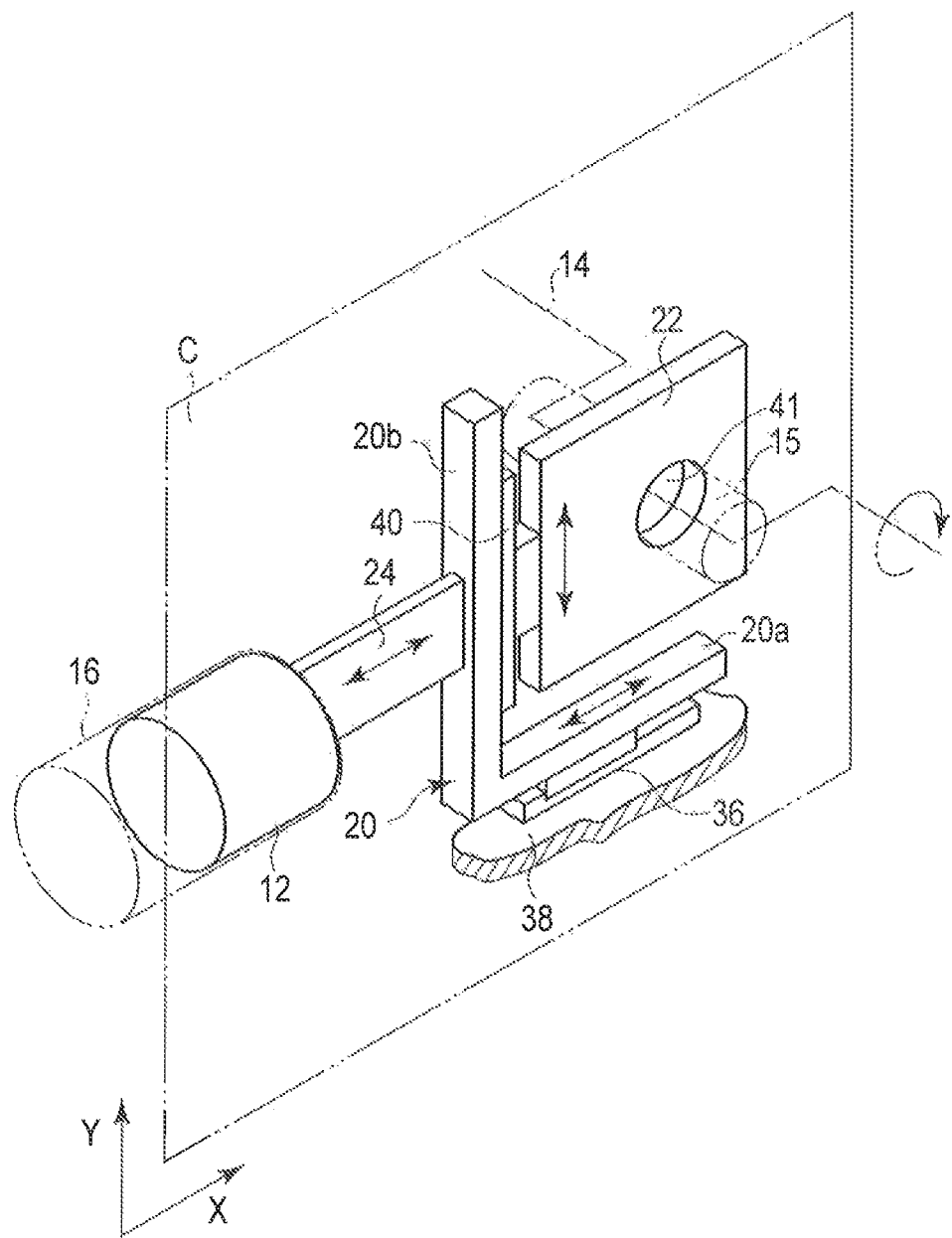
FIG. 18 is a perspective view showing a basic configuration of one cylinder in the engine unit.
Figure 19:
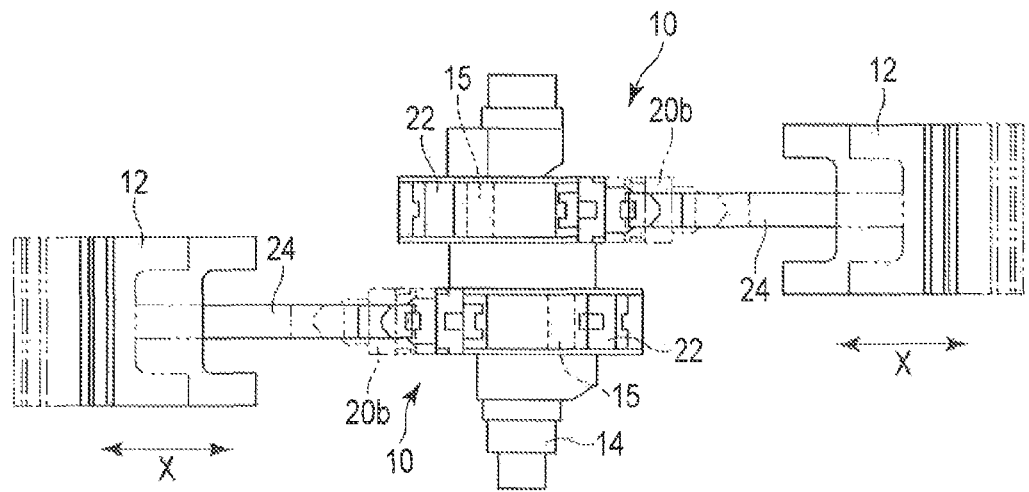
FIG. 19 is a plan view of the engine unit.
Figure 20:
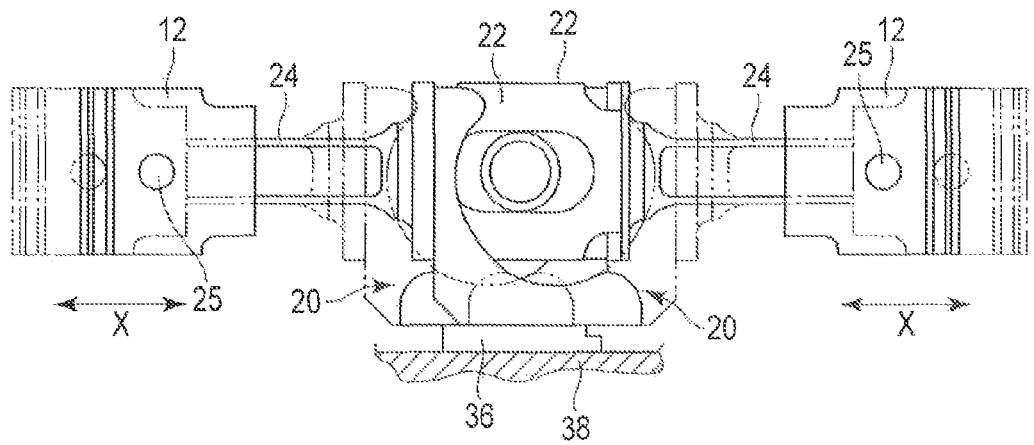
FIG. 20 is a side view of the engine unit.

The frictional resistance Fm in the XY separate crank mechanism according to the present embodiment and the frictional resistance Fs according to the comparative example are overlapped and shown in graph form as shown in FIG. 15. From FIG. 15, according to the XY separate crank mechanism in the present embodiment, it is evident that the frictional resistance, that is, the frictional loss is significantly reduced when compared with the crank mechanism according to the comparative example.

In crank motion of the crank mechanism according to the comparative example, a force applied to the upper part of the piston 12 acts while causing friction in top and bottom portions of two spheres. Thus, large frictional losses are generated. When a large piston is used, oil may run out, leading to a seizure. Thus, in most cases, a low-speed operation of 80 rpm or so is forced. According to the XY separate crank mechanism 10 in the present embodiment, by contrast, transmission efficiency of force of more than 99% is obtained in both the X- and Y-axis directions so that, when compared with the transmission efficiency of 50% of conventional slider crank motion, a force can be transmitted with about double efficiency. Because this is bidirectional motion conversion, both prime movers and receivers can be realized. That is, similar efficiency can be achieved both by engines and compressors.

By using an XY separate crank mechanism, as described above, no frictional loss is caused so that a conventional cross head can be eliminated. Thus, a large piston can be operated at high speed without causing oil to run out. Therefore, the XY separate crank mechanism can be applied to piston sliders having the capacity of a conventional large turbine. When compared with a turbine, efficiency will be enormously improved.

A driving apparatus including the XY separate crank mechanism 10 configured as described above becomes a compressor or an expansion machine if the motor is arranged on the rotation side and an engine mechanism if a fluid or gas is injected to the piston side for combustion. The configuration can be changed by the mutual combination.

According to the above Z-mechanism XY separate crank mechanism 10, when compared with a mechanism using an oscillating connecting rod or a slider crank, no side thrust loss (frictional loss) occurs and an occurrence of vibration or heat can also be reduced. Thus, elements such as a piston and cylinder of a driving apparatus can be formed of a light material such as plastics and ceramics. Accordingly, insulation effectiveness and weight reduction become still easier.

The support member 20 and the crank connecting member 22 of the XY separate crank mechanism 10 are formed in a shape and dimensions that can be accommodated in a region between a rotation region of the crankshaft 14 and a movement region of the piston 12. Accordingly, the XY separate crank mechanism 10 can be configured in a size comparable to a major-diameter portion of a conventional connecting rod and to a size that allows the crank of an engine or compressor using a conventionally used crank slider mechanism to be used as it is. Therefore, the XY separate crank mechanism can be substituted without changing a conventional combustion mechanism or valve mechanism.

If water is used as a fluid, an operating system in a closed space is formed, making the system efficient. If, for example, the piston and the XY separate crank mechanism 10 are arranged as a triad configuration, an efficient power generation system can be realized because auto activation is enabled. The XY separate crank mechanism 10 can also be used for turbine power. If set as a receiver, a pump efficient as a pump can be configured.

FIGS. 16, 17, 18, 19, and 20 show an embodiment applied to a 2-cylinder horizontal opposed type engine unit. The engine unit includes the crankshaft 14 and the crankshaft has the two crank pins 15 arranged with the phases being mutually shifted by 180°. These crank pins 15 are positioned eccentrically with respect to the crankshaft 14 and eccentrically rotate around the crankshaft. The engine unit also includes the two pistons 12 provided to be freely reciprocatable inside the cylinders 16 in the X-axis direction and these pistons 12 are arranged at both ends of the crankshaft 14 in orientations opposite to each other by 180° and also arranged in the axial direction of the crankshaft 14 mutually shifted by a predetermined distance.

The Z-mechanism XY separate crank mechanism 10 is provided between each of the pistons 12 and the crankshaft 14. The Z-mechanism XY separate crank mechanism 10 includes the support member 20 provided freely reciprocatingly in the X-axis direction in the reference plane C containing the center axis (movement axis) of the piston 12, the crank connecting member 22 mounted on the support member 20 freely reciprocatingly in the second direction (Y-axis direction) perpendicular to the X-axis direction, and the connecting member 24 that connects the piston 12 and the support member 20.

The support member 20 is formed, for example, in an L-shape and integrally includes the first support portion 20a extending in the X-axis direction and the second support portion 20b extending in the Y-axis direction from the first support portion. The first support portion 20a is freely reciprocatingly supported and guided in the X-axis direction by the first linear slider 36. In the present embodiment, the first linear slider 36 is fixed to the base 38 and provided fixedly.

The second linear slider 40 extending in the Y-axis direction is fixed to the second support portion 20b of the support member 20. The crank connecting member 22 is formed, for example, in a plate shape and one end thereof is freely reciprocatingly supported by the second linear slider 40 in the Y-axis direction. The crank connecting member 22 is provided in the reference plane C and the other end thereof is connected to the crankshaft 14. That is, the circular bore 41 is formed at the other end of the crank connecting member 22. The crank pin 15 of the crankshaft 14 is rotatably inserted through the bore 41 via a ball bearing or plane bearing. Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12 via a piston pin 25, and the other end thereof is connected to the second support portion 20b of the support member 20 by bolting. The connecting member 24 extends coaxially with the center axis (movement axis) of the piston 12. The connecting member 24 reciprocates integrally with the support member 20 in the X-axis direction to cause the piston 12 to reciprocate in the X-axis direction.

The XY separate crank mechanism 10 disposed between the other piston 12 and the crankshaft 14 also has a configuration similar to that described above and provided in the orientation opposite by 180°. The crank connecting members 22 of the two XY separate crank mechanisms 10 are provided mutually in parallel and similarly, the support members 20 are also provided mutually in parallel.

In the engine unit configured as described above, the piston 12 reciprocates when a driving force is input into the piston 12 by compression and combustion of fuel. The reciprocating motion of the piston 12 is transmitted to the crankshaft 14 after being converted into rotational motion by the reciprocating motion of the support member 20 in the X-axis direction and the reciprocating motion of the crank connecting member 22 in the Y-axis direction in the XY separate crank mechanism 10. Accordingly, rotational output is provided to the crankshaft 14.

The above horizontal opposed type engine unit is not limited to two cylinders and may have three cylinders or more. FIG. 21 schematically shows an embodiment applied to, for example, a 4-cylinder horizontal opposed type engine unit. The four crank pins 15 corresponding to the cylinders are provided in the crankshaft 14 and these crank pins provided with the phases thereof being mutually shifted by, for example, 180°. Each of the pistons 12 is connected to the corresponding crank pin 15 by the XY separate crank mechanism 10 described above.

Figure 22:
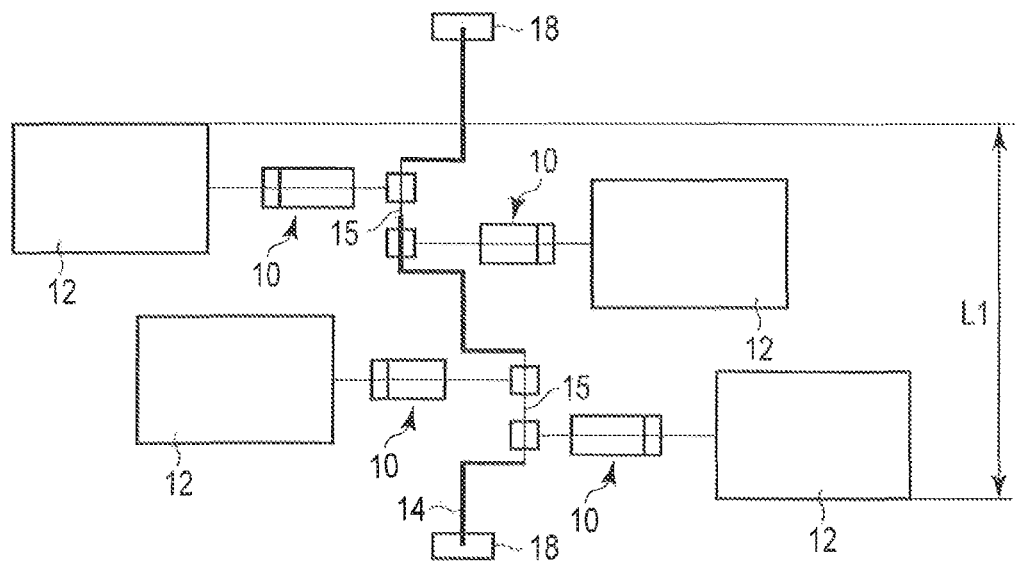
FIG. 22 is a plan view showing another 4-cylinder engine unit including the XY separate crank mechanism according to the embodiment.

In a multi-cylinder engine unit, like an embodiment shown in FIG. 22, the pistons 12 opposite to each other across one crank pin 15 may each be connected via the XY separate crank mechanism 10. In this case, a dimension L1 of the engine unit in the axial direction of the crankshaft 14 can be shortened to downsize the engine unit. For example, a mechanism of four cylinders can be installed in an installation space of conventional two cylinders.

Figure 23:
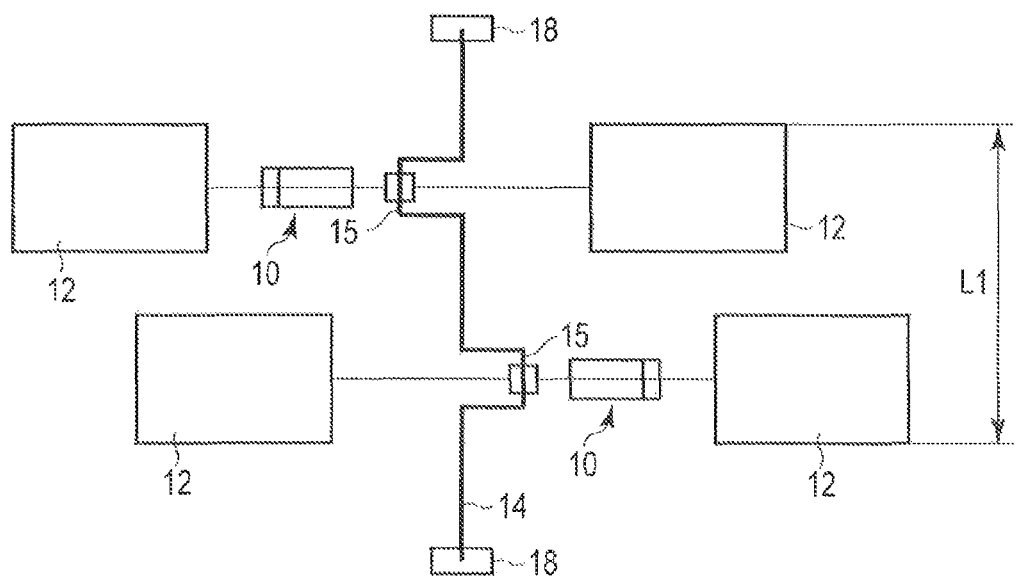
FIG. 23 is a plan view showing still another 4-cylinder engine unit including the XY separate crank mechanism according to the embodiment.

In a multi-cylinder engine unit, like an embodiment shown in FIG. 23, the two opposed pistons 12 may coaxially be arranged horizontally oppositely. This can be realized by using, for example, the horizontally coaxial transverse Z-mechanism XY separate crank mechanism 10 shown in FIG. 3. According to the configuration, the dimension L1 of the engine unit in the axial direction of the crankshaft 14 can further be shortened to downsize the engine unit.

Figure 24:
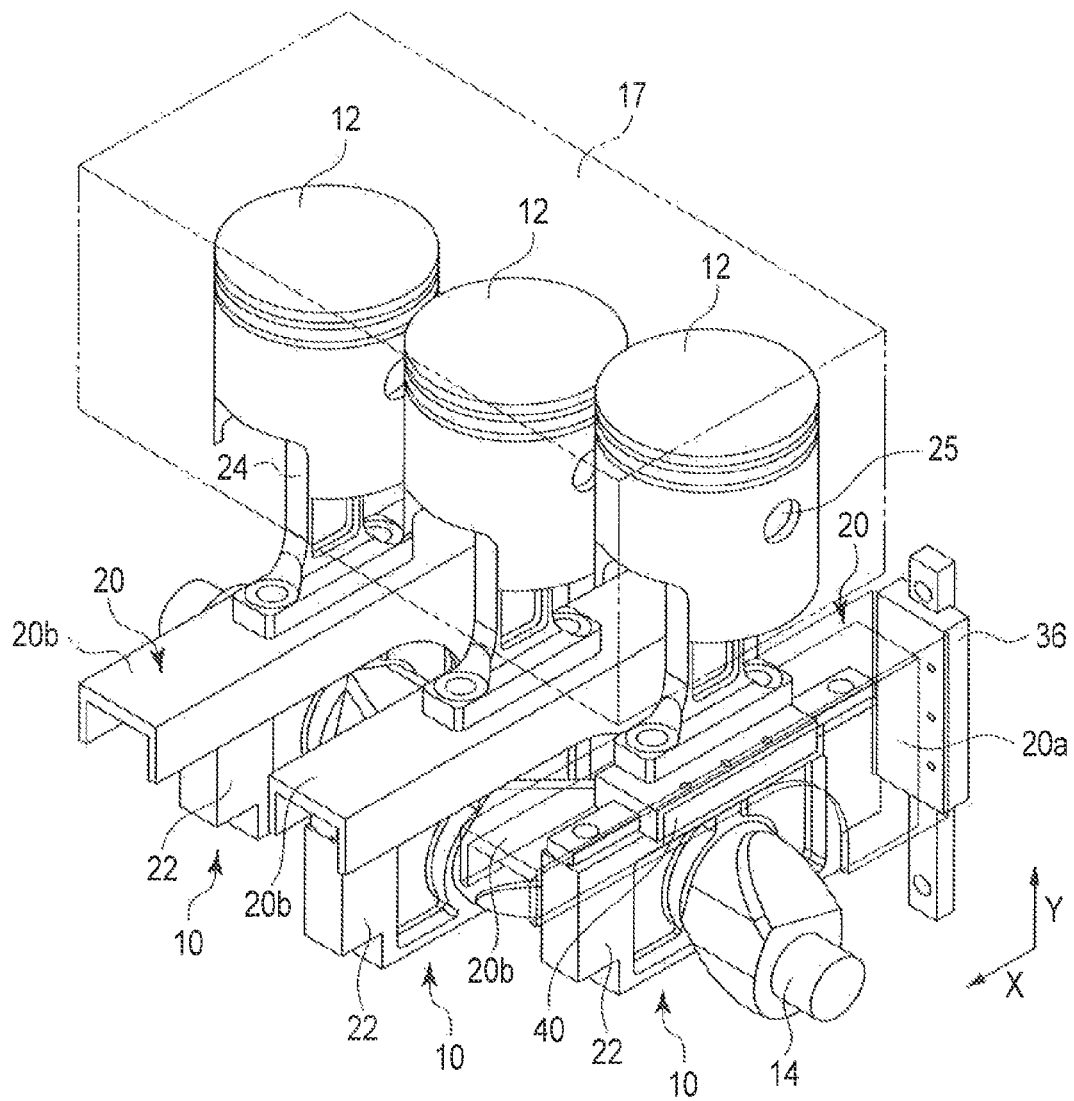
FIG. 24 is a perspective view showing a compressor including the XY separate crank mechanism according to the embodiment.
Figure 25:
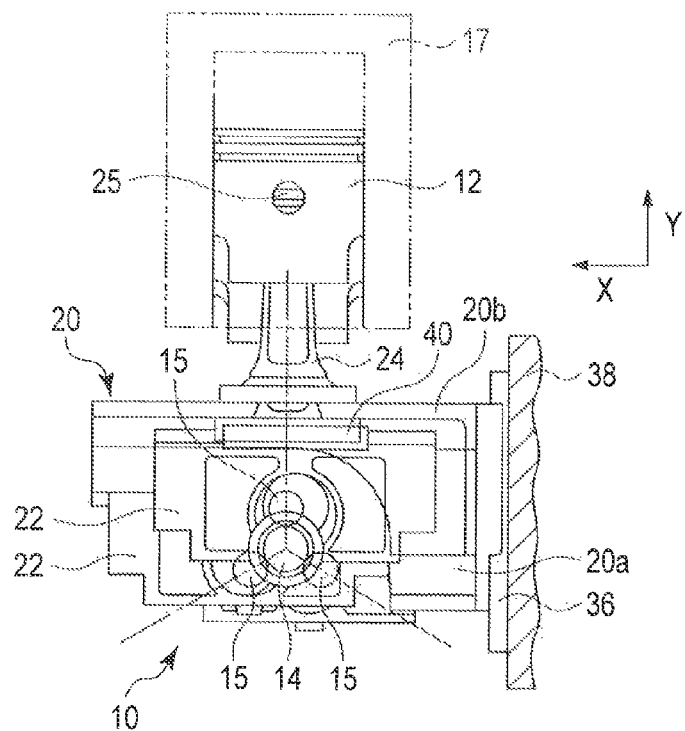
FIG. 25 is a side view of the compressor.
Figure 26:
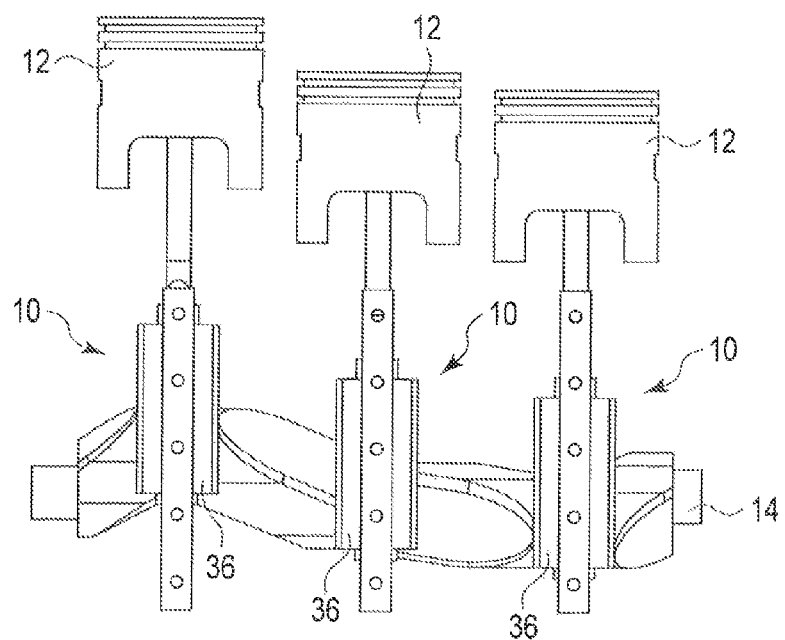
FIG. 26 is a front view of the compressor.

FIGS. 24, 25, and 26 show an embodiment applied to a 3-cylinder compressor. The compressor includes the crankshaft 14 extending in the horizontal direction and the crankshaft has the three crank pins 15 arranged with phases being mutually shifted by a predetermined angle. These crank pins 15 are positioned eccentrically with respect to the crankshaft 14 and eccentrically rotate around the crankshaft. The compressor also includes the three pistons 12 provided freely reciprocatingly in the Y-axis direction inside a cylinder block 17 and these pistons 12 are provided in three reference planes that are each perpendicular to the crankshaft 14 and also mutually in parallel with clearance therebetween.

The Z-mechanism XY separate crank mechanism 10 is provided between each of the pistons 12 and the crankshaft 14. Each of the Z-mechanism XY separate crank mechanisms 10 includes the support member 20 provided freely reciprocatingly in the Y-axis direction in the reference plane containing the center axis (movement axis) of the piston 12, the crank connecting member 22 mounted on the support member 20 freely reciprocatingly in the second direction (X-axis direction) perpendicular to the Y-axis direction in the reference plane, and the connecting member 24 that connects the piston 12 and the support member 20.

The support member 20 is formed in an L-shape and integrally includes the first support portion 20a extending in the Y-axis direction and the second support portion 20b extending in the X-axis direction from the first support portion. The first support portion 20a is freely reciprocatingly supported and guided in the Y-axis direction by the first linear slider 36. In the present embodiment, the first linear slider 36 is fixed to the base 38 and provided fixedly.

The second linear slider 40 extending in the X-axis direction is fixed to the second support portion 20b of the support member 20. The crank connecting member 22 is formed, for example, in a plate shape and one end thereof is freely reciprocatingly supported by the second linear slider 40 in the X-axis direction. The crank connecting member 22 is provided in the reference plane and the other end thereof is connected to the crankshaft 14. That is, a circular bore is formed at the other end of the crank connecting member 22 and the crank pin 15 of the crankshaft 14 is rotatably inserted through the bore 41 via a ball bearing or slide bearing. Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12 via the piston pin 25, and the other end thereof is connected to the second support portion 20b of the support member 20. The connecting member 24 extends coaxially with the center axis (movement axis) of the piston 12. The connecting member 24 reciprocates integrally with the piston 12 and the support member 20 in the Y-axis direction.

The XY separate crank mechanism 10 disposed between the other pistons 12 and the crankshaft 14 also has a configuration similar to the above configuration. The crank connecting members 22 of the three XY separate crank mechanisms 10 are provided mutually in parallel and similarly, the support members 20 are also provided mutually in parallel. Further, the three first linear sliders 36 are fixed to, for example, the common base 38.

In the compressor configured as described above, if, for example, the crankshaft 14 rotates after a turning effort being input to the crankshaft 14 by a motor or the like, a plurality of the crank pins 15 rotates eccentrically around the crankshaft 14. The motion of the eccentric rotation is separated into movement in the X-axis direction and movement in the Y-axis direction by the crank connecting member 22 and the support member 20 of the XY separate crank mechanism 10, respectively, the crank connecting member 22 is caused to reciprocate by the second linear slider 40 in the X-axis direction, and the support member 20 is caused to reciprocate by the first linear slider 36 in the Y-axis direction together with the crank connecting member 22. The reciprocating motion of the support member 20 in the Y-axis direction is transmitted to the piston 12 via the connecting member 24 and the piston 12 reciprocates inside the cylinder block 17 in the Y-axis direction. In this manner, rotational motion of the crankshaft 14 is transmitted to the piston 12 after the rotational motion being converted into reciprocating motion by each of the XY separate crank mechanisms 10. Accordingly, a gas or liquid inside the cylinder block 17 is pressurized and supplied to the outside as a pressurized fluid.

According to the engine unit or compressor, as described above, if the L-shaped support members 20 of the XY separate crank mechanism 10 are arranged opposite to each other as mirror images, a horizontal opposed type engine unit or compressor can be configured by arranging pistons in positions on the same crankshaft in orientations opposite to each other by 180°. The XY separate crank mechanism 10 is sufficiently small and thus, a conventional connecting rod portion can easily be replaced by the present crank mechanism. A plurality of the XY separate crank mechanisms 10 can be used by designing the crank mechanism with the width fitting to the width of the crankshaft 14 and overlapping the crank mechanisms. The crank width can be set to a size that allows the crank of an engine or compressor using a conventionally used crank slider mechanism to be used as it is. Therefore, the XY separate crank mechanism 10 can be substituted without changing a conventional combustion mechanism or valve mechanism.

The XY separate crank mechanism can freely be overlapped with each other 2-fold, 3-fold, 4-fold and so on. If crankshafts are coaxially arranged, the crankshaft may be half as long as a conventional crankshaft and thus, conventional two cylinders can be configured and used as four cylinders, conventional three cylinders as six cylinders, and conventional four cylinders as eight cylinders. A plurality of XY separate crank mechanisms is not limited to arrangement horizontally or vertically opposite to each other and may also be star-arranged.

A dual rotation system can be configured by arranging a plurality of single rotation systems to which the XY separate crank mechanism 10 is connected in mirror images. If a piston is arranged in a position where L-shaped support members are arranged back to back and double crankshafts are arranged, a dual rotation system can be configured to obtain rotational output that mutually counterrotates.

Moreover, a movable body that is propelled by a dual coaxial rotation system like a torpedo can also be produced easily and thus, the XY separate crank mechanism is also useful for a marine engine. A flight without deflection is easily enabled by using an XY separate crank mechanism for a driving apparatus of an airplane or helicopter. If the driving apparatus is applied to a common marine engine, coaxial counterrotation can easily be obtained and thus, the engine will be a stable marine engine.

According to a driving apparatus configured as described above, a twist phenomenon can be prevented by arranging one linear guide in the center of two bearing trains. If two linear guides are used out of necessity of strength, these linear guides can be used without causing an umbrella opening loss by arranging the linear guides in the same plane.

In the above embodiments, the first linear slider is configured to be grounded to the horizontal plane or vertical plane and the piston is configured to operate in the X-axis direction Y-axis direction, but the piston can operate at any angle by setting the grounding angle of the first linear slider to any angle in the XYZ directions.

In the XY separate crank mechanism, the support portion that freely reciprocatingly supports the support member and crank connecting member is not limited to the linear slider and other support structures may be adopted.

Figure 27:
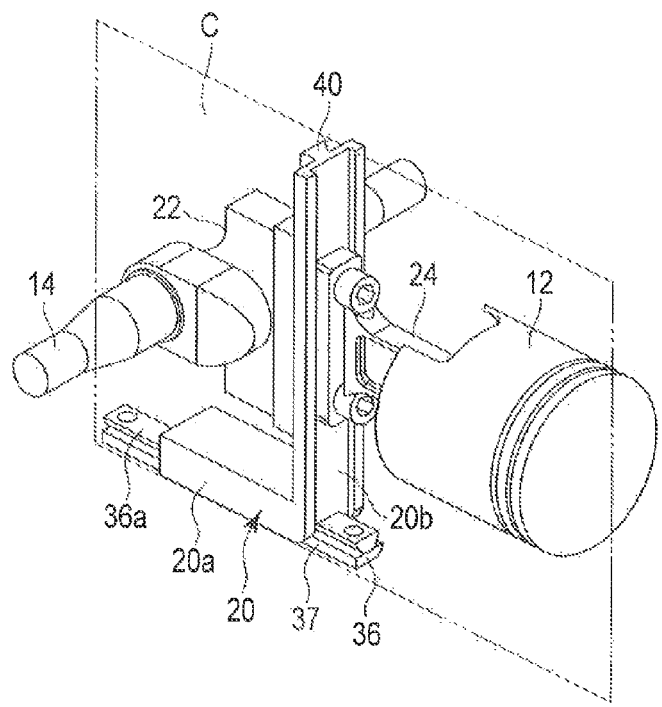
FIG. 27 is a perspective view showing the Z-mechanism XY separate crank mechanism according to another embodiment.
Figure 28:
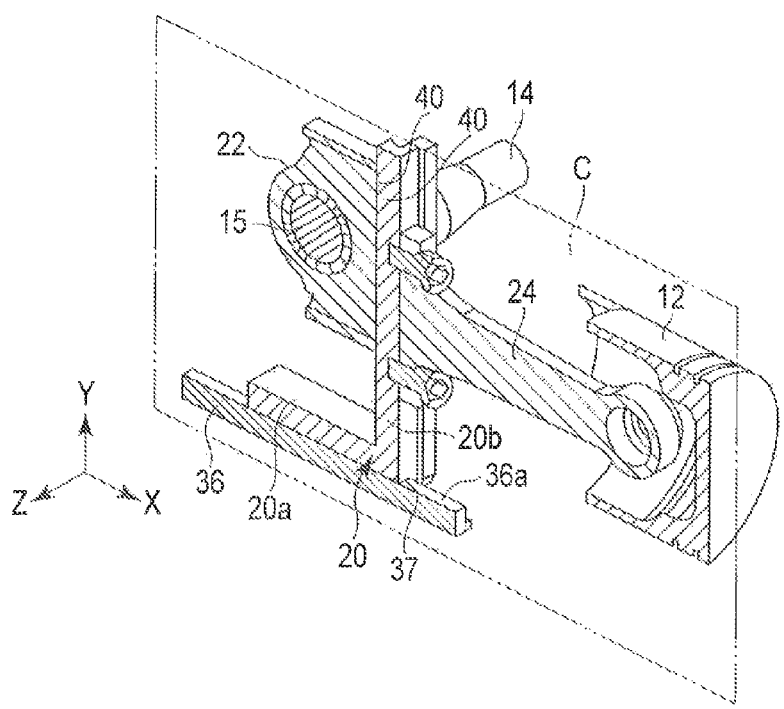
FIG. 28 is a sectional view of the Z-mechanism XY separate crank mechanism according to the other embodiment.

FIGS. 27 and 28 show the Z mechanism XY separate crank mechanism according to another embodiment, FIG. 29 shows a support member of the XY separate crank mechanism, and FIG. 30 shows a cross section of a slide guide. According to the embodiment, instead of the linear slider, a slide support structure based on a dovetail groove is used. If the direction of movement of the piston 12 is set as the X-axis direction, the first support portion 20a of the support member 20 extends in the X-axis direction and also the first support portion 20a has a dovetail groove 37 extending in the X-axis direction formed therein. A slide guide 36 provided fixedly includes a rib 36a extending in the X-axis direction and the cross section of the rib 36a is formed in a trapezoidal shape corresponding to the dovetail groove 37. By engaging the rib 36a of the slide guide 36 with the dovetail groove 37, the first support portion 20a is freely slidingly supported by the slide guide 36 in the X-axis direction.

The dovetail groove 37 and the slide guide 36 containing the rib 36a engaged therewith have centers thereof positioned in the reference plane C of the XY separate crank mechanism 10 and a dimension d1 of the dovetail groove 37 and the rib 36a is formed to a dimension common on both sides of the reference plane C.

Similarly, the second support portion 20b extending in the Y-axis direction of the support member 20 includes a slide guide 40 extending in the Y-axis direction and the slide guide 40 is formed in a trapezoidal shape corresponding to the dovetail groove. The crank connecting member 22 has a dovetail groove 42 extending in the Y-axis direction formed therein. By engaging the slide guide 40 with the dovetail groove 42, the crank connecting member 22 is freely slidingly supported by the slide guide 40 in the Y-axis direction. The other configuration of the XY separate crank mechanism 10 is the same as in the above embodiment and a detailed description thereof is omitted by attaching the same reference numerals to the same portions.

If a dovetail groove and a slide guide are combined and used as described above, a coefficient of dynamic friction m between the support member 20 and the crank connecting member 22 is, for example, 0.1. When a slide guide structure as described above is used, an operation/working-effect similar to that of the above embodiment can be gained.

FIGS. 31, 32, and 33 show an embodiment applied to a driving apparatus including a horizontally coaxial linear XY separate crank mechanism, for example, a 2-cylinder coaxial horizontal opposed-type engine unit.

The engine unit includes a crankshaft 14 rotatably supported by a bearing (not shown) or the like and the crankshaft has one crank pin 15. The crank pin 15 is positioned eccentrically with respect to the crankshaft 14 and eccentrically rotate around the crankshaft. The engine unit also includes two pistons 12a, 12b provided freely reciprocatingly in the first direction (X-axis direction) inside each of cylinders 16. These pistons 12 are arranged at both ends of the crankshaft 14 in mutually opposite directions (180°) and also arranged coaxially. In the present embodiment, the pistons 12a, 12b are formed as, for example, short pistons having almost no skirt.

In the engine unit, a horizontally coaxial linear XY separate crank mechanism 10 is provided between a pair of the pistons 12a, 12b arranged horizontally opposite to each other and freely reciprocatingly in the first direction (X-axis direction) and the crankshaft 14 extending in a direction perpendicular to the reference plane (transmission plane) C containing the center axis (movement axis) of the pistons 12 as a movable body and is configured to transmit reciprocating motion of each of the pistons 12a, 12b in the first direction and rotational motion of the crankshaft 14 after mutually converting the motion.

In the present embodiment, the horizontally coaxial linear XY separate crank mechanism 10 includes two support members 20A, 20B provided freely reciprocatingly in the X-axis direction independently in the reference plane C containing the center axis (movement axis) of the pistons 12a, 12b, a common both-crank connecting member 22 mounted on the support members 20A, 20B freely reciprocatingly in the second direction (Y-axis direction) perpendicular to the X-axis direction in the reference plane C, and a connecting member 24 connecting the pistons and the support members.

The support member 20A is formed in, for example, an L-shape and integrally includes a first support portion 20a extending in the X-axis direction and a second support portion 20b extending in the Y-axis direction from the first support portion. The first support portion 20a is freely reciprocatingly supported and guided in the X-axis direction by a slide guide 36. In the present embodiment, a dovetail groove 37 extending in the X-axis direction is formed in the first support portion 20a. The slide guide 36 provided fixedly on a base 38 has a rib 36a extending in the X-axis direction and the section of the rib 36a is formed in a trapezoidal shape corresponding to the dovetail groove 37. The first support portion 20a is freely slidingly supported by the slide guide 36 in the X-axis direction by the rib 36a of the slide guide 36 being engaged with the dovetail groove 37.

The second support portion 20b extending in the Y-axis direction of the support member 20A includes a slide guide 40 and the slide guide 40 is formed is formed in a trapezoidal shape corresponding to the dovetail groove. The both-crank connecting member 22 is formed in an almost rectangular block shape and a dovetail groove 42a extending in the Y-axis direction is formed on one of side faces thereof. The both-crank connecting member 22 is freely slidingly supported by the slide guide 40 in the X-axis direction by the slide guide 40 being engaged with the dovetail groove 42a.

The connecting member 24 is configured as, for example, an elongated connecting rod, one end thereof is directly connected to a bottom wall of the piston 12a, and the other end thereof is connected to the second support portion 20b of the support member 20A. The connecting member 24 extends coaxially with the center axis (movement axis) of the piston 12. The connecting member 24 reciprocates integrally with the support member 20A in the X-axis direction to cause the piston 12a to reciprocate in the X-axis direction.

The other support member 20B is configured in the same manner as the support member 20A and is arranged symmetrically with respect to the support member 20A. That is, the support member 20B is formed in, for example, an L-shape and integrally includes the first support portion 20a extending in the X-axis direction and the second support portion 20b extending in the Y-axis direction from the first support portion. The first support portion 20a is freely reciprocatingly supported and guided in the X-axis direction by a slide guide 36. The dovetail groove 37 extending in the X-axis direction is formed and the first support portion 20a is freely slidingly supported by the slide guide 36 in the X-axis direction by the rib 36a of the slide guide 36 being engaged with the dovetail groove 37. One end of the first support portion 20a is opposed to the integrated first support portion 20a of the support member 20A with a small gap G.

To reduce mutual interference and vibration of the two support members 20A, 20B, a cushioning medium such as elastomer may be inserted into the gap G between the support members 20A, 20B.

The second support portion 20b of the support member 20B extending in the Y-axis direction is opposed in parallel to the second support portion 20b of the support member 20A with a gap therebetween. The second support portion 20b has the slide guide 40 extending in the Y-axis direction and the slide guide 40 is formed in a trapezoidal shape corresponding to a dovetail groove.

The both-crank connecting member 22 has a dovetail groove 42b extending in the Y-axis direction formed on the other side face. The both-crank connecting member 22 is freely slidingly supported by the slide guide 40 in the X-axis direction by the slide guide 40 of the support member 20B being engaged with the dovetail groove 42b. Accordingly, the both-crank connecting member 22 is positioned in the reference plane C and also connected to the second support portion 20b of the two support members 20A, 20B freely movingly in the Y-axis direction.

The connecting member 24 is configured as, for example, an elongated connecting rod, one end thereof is directly connected to the bottom wall of the piston 12b, and the other end thereof is connected to the second support portion 20b of the support member 20B by bolting or the like. The connecting member 24 extends coaxially with the center axis (movement axis) of the piston 12b. The connecting member 24 reciprocates integrally with the support member 20B in the X-axis direction to cause the piston 12b to reciprocate in the X-axis direction.

The both-crank connecting member 22 is provided in the reference plane C and a center portion thereof is connected to the crankshaft 14. That is, a circular bore 41 is formed in the center portion of the both-crank connecting member 22. The crank pin 15 of the crankshaft 14 is rotatably inserted through the bore 41 via a ball bearing or plane bearing. Accordingly, the both-crank connecting member 22 is engaged with the crankshaft 14 to connect the crankshaft 14 and the support member 20. The both-crank connecting member 22 is configured to be able to be divided into two portions through the bore 41 by a division surface passing through the bore 41, for example, a division surface 43 extending in the Y-axis direction, that is, to be able to be divided vertically so that the crank pin 15 can easily be engaged with when assembled.

In an engine unit including the horizontally coaxial linear XY separate crank mechanism 10 configured as described above, when a driving force by compressed and burned fuel is input to the pistons 12a, 12b, the pistons 12a, 12b reciprocate in the first direction. The reciprocating motion of the pistons 12a, 12b is converted into rotational motion by reciprocating motion in the X-axis direction of the support members 20A, 20B and reciprocating motion in the Y-axis direction of the both-crank connecting member 22 in the XY separate crank mechanism 10 and transmitted to the crankshaft 14 via the crank pin 15. In this manner, rotational output is provided to the crankshaft 14.

By grounding the first support portion 20a of the two support members 20A, 20B in the first direction (X-axis direction), the pistons 12a, 12b will reciprocate in the first direction. At this point, the both-crank connecting member 22 makes a circular motion while making a parallel motion in the Y-axis direction. Alternatively, by grounding the first support portion 20a of the two support members 20A, 20B in the second direction (Y-axis direction), the pistons 12a, 12b will reciprocate in the second direction. At this point, the both-crank connecting member 22 makes a circular motion while making a parallel motion in the X-axis direction.

Also by providing the two support members 20A, 20B freely movingly in the first direction individually, arranging with the gap G therebetween, and further connecting the two support members 20A, 20B to the crankshaft via the single both-crank connecting member 22, a force can be transmitted to the pistons 12a, 12b only by the Y-axis linear slider from the both-crank connecting member 22 as the transmission path of force. As a result, transmission losses of force can be reduced. The right and left support members 20A, 20B do not interfere with each other with the gap G provided therebetween and will operate individually, though the appearance seems to be the same. By inserting a cushioning medium into the gap G, a vibration damping action may also be expected.

Like an embodiment shown in FIG. 34, the support members 20A, 20B are not limited to the L-shape and may each be formed in an approximate T-shape. That is, the first support portion 20a of the two support members 20A, 20B extends in both right and left directions with respect to the second support portion 20b and the second support portion 20b extends in the Y-axis direction from the center portion in the longitudinal direction of the first support portion 20a. Thus, the support members 20A, 20B can be supported with more stability by making the first support portion 20a longer.

Like an embodiment shown in FIG. 35, the two support members 20A, 20B may be connected to each other. In this case, the first support portion of the support member 20A and the first support portion 20a of the support member 20B are connected by a connecting plate 23. The connecting plate 23 is formed in a substantially long band shape, extends in the X-axis direction, and is bolted to the two first support portions 20*a*.

In the embodiments shown in FIGS. 34 and 35, the other configuration is the same as that shown in FIGS. 31 to 33 and the same reference numerals are attached to the same units to omit a detailed description thereof.

Figure 37:
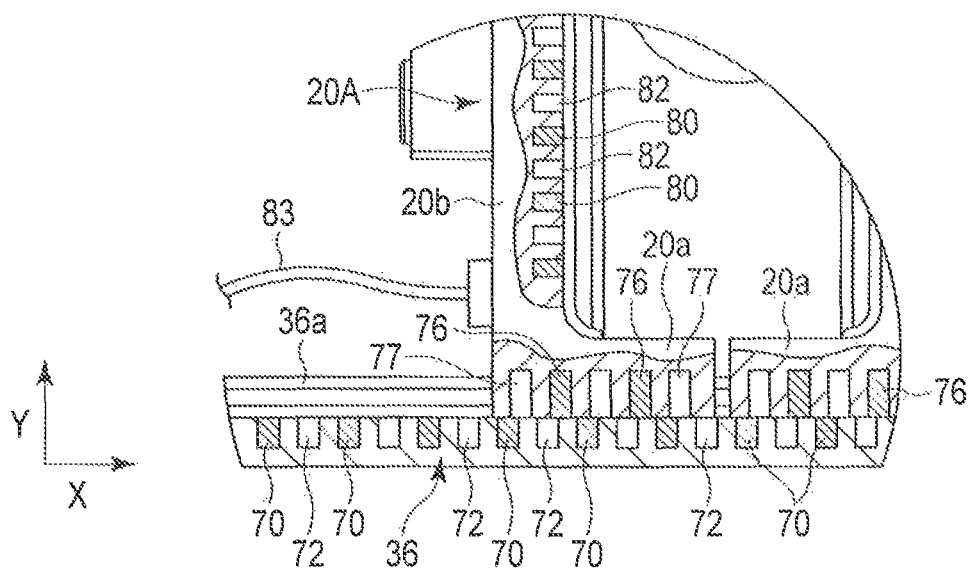
FIG. 37 is a side view showing the engine unit in FIG. 36 by enlarging a portion thereof and breaking a portion thereof.
Figure 38:
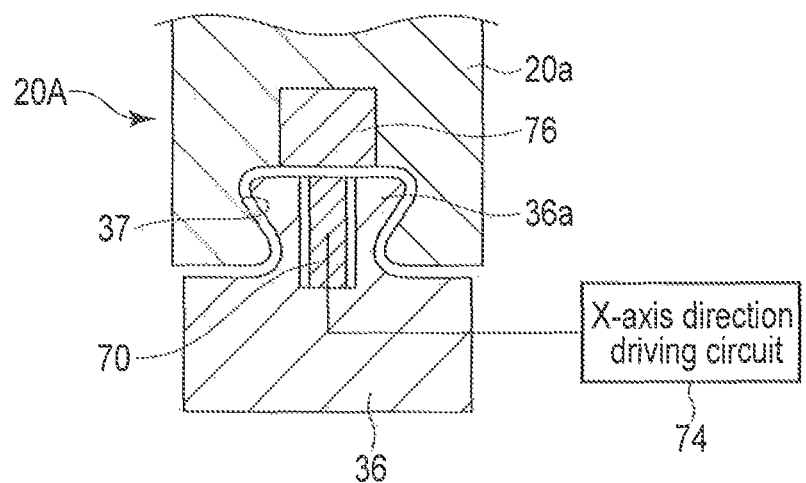
FIG. 38 is a sectional view of the slide guide and support member of the engine unit.

FIGS. 36, 37, and 38 show another embodiment applied to the driving apparatus including the horizontally coaxial linear XY separate crank mechanism, for example, the 2-cylinder coaxial horizontal opposed-type engine unit. In the present embodiment, permanent magnets or electromagnets are arranged between a slide guide and a support member and linear flotation of the support member is supported by using a repulsive force of these magnets. The other configuration is the same as that shown in FIGS. 31 to 33 and the same reference numerals are attached to the same units to omit a detailed description thereof.

As shown in FIGS. 36, 37, and 38, a plurality of electromagnets 70 and a plurality of sensors 72 are alternately arranged and embedded in the X-axis direction inside a slide guide 36 that guides movement in the X-axis direction. These electromagnets 70 and sensors 72 are connected to an X-axis direction driving circuit 74 via a cable 73 and the X-axis direction driving circuit is connected to a control circuit 75. Also, a plurality of permanent magnets 76 and sensors 77 is alternately arranged and embedded in the X-axis direction in the first support portions 20*a* of the two support members 20A, 20B and is exposed to a dovetail groove 37 and also opposed to the electromagnets 70 and the sensors 72 on the side of the slide guide 36.

Similarly, a plurality of electromagnets 80 and a plurality of sensors 82 are alternately arranged and embedded in the Y-axis direction inside a slide guide 40 that is provided in the second support portion 20*b* of the support members 20A, 20B to guide movement in the Y-axis direction. These electromagnets 80 and sensors 82 are connected to a Y-axis direction driving circuit 84 via a cable 83 and the Y-axis direction driving circuit is connected to the control circuit 75. Also, a plurality of magnets 86 and sensors 87 is alternately arranged and embedded in the Y-axis direction on both side faces of the both-crank connecting member 22 and is exposed to a dovetail groove and also opposed to the electromagnets 80 and the sensors 82 on the side of the slide guide 40.

Figure 39:
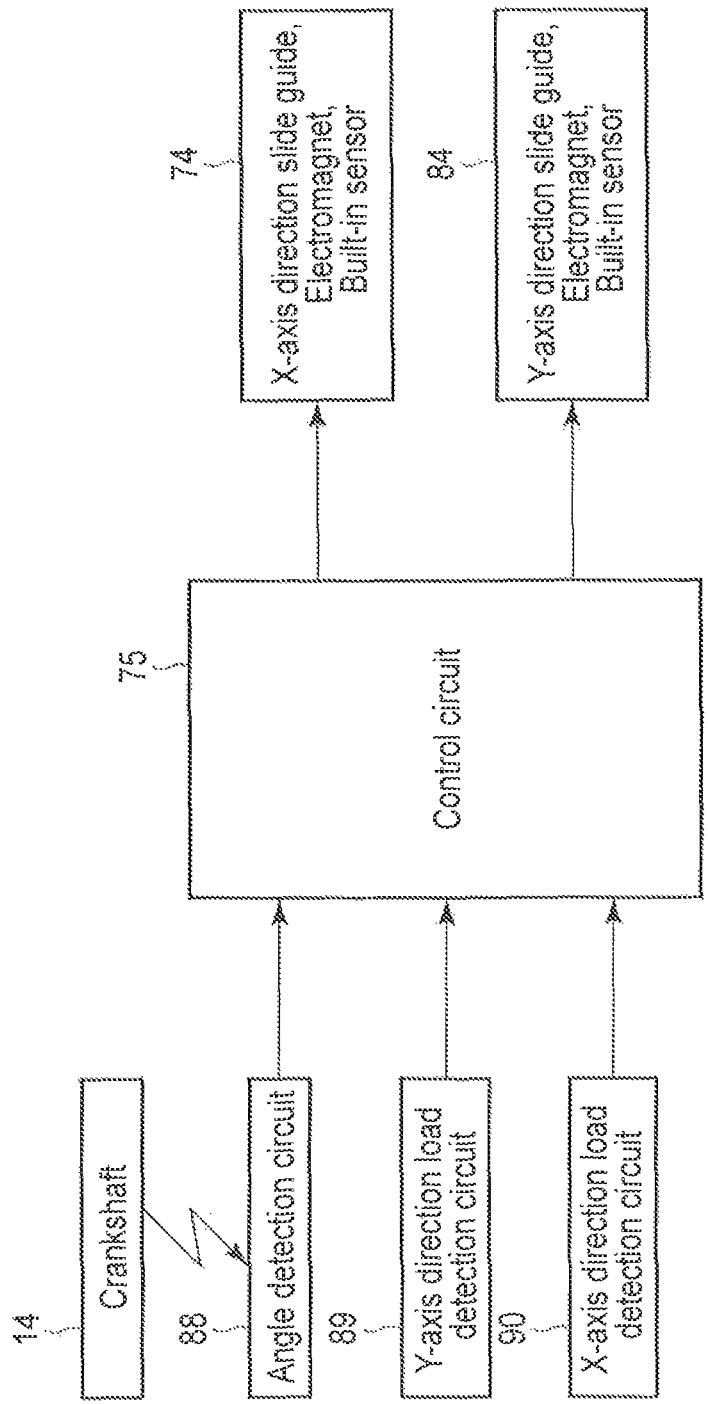
FIG. 39 is a block diagram showing a control circuit configuration of the engine unit.

As shown in FIG. 39, a coaxial horizontal opposed-type driving apparatus includes an angle detection circuit detection circuit 88 that detects the rotation angle of the crankshaft 14, a Y-axis direction load detection circuit 89 that detects a Y-axis direction load in accordance with a detection signal by the sensors 82, 87, and an X-axis direction load detection circuit 90 that detects an X-axis direction load in accordance with a detection signal by the sensors 72, 77 and these circuits are connected to the control circuit 75 to output a detection signal to the control circuit 75.

In an engine unit including the horizontally coaxial linear XY separate crank mechanism 10 configured as described above, when a driving force by compressed and burned fuel is input to the pistons 12*a*, 12*b*, the pistons 12*a*, 12*b* reciprocate in the first direction. The reciprocating motion of the pistons 12*a*, 12*b* is converted into rotational motion by reciprocating motion in the X-axis direction of the support members 20A, 20B and reciprocating motion in the Y-axis direction of the both-crank connecting member 22 in the XY separate crank mechanism 10 and transmitted to the crankshaft 14 via the crank pin 15. In this manner, rotational output is provided to the crankshaft 14.

In the engine unit in the above configuration, a case when a load acting on the X-axis direction slide guide 36 or the Y-axis direction slide guide 40 increases depending on the position of rotation angle of the crankshaft 14 can be considered. Thus, a Y-axis direction load is detected by the Y-axis direction load detection circuit 89 depending on a detection signal of the sensors 82, 87 to detect the rotation angle of the crankshaft 14 at which the load increases by the angle detection circuit detection circuit 88. Similarly, an X-axis direction load is detected by the X-axis direction load detection circuit 90 depending on a detection signal of the sensors 72, 77 to detect the rotation angle of the crankshaft 14 at which the load increases by the angle detection circuit detection circuit 88. Then, a magnetic force is caused by energizing the electromagnets 70, 80 from the X-axis direction driving circuit 74 and the Y-axis direction driving circuit 84 in a position of rotation angle at which the load increases under the control of the control circuit 75. The support members 20A, 20B are floated by repulsion of the magnetic force and a magnetic force from permanent magnets provided on the side of the support members 20A, 20B. Accordingly, frictional losses between the support members 20A, 20B and the slide guides 36, 40 can be reduced.

Figure 40:
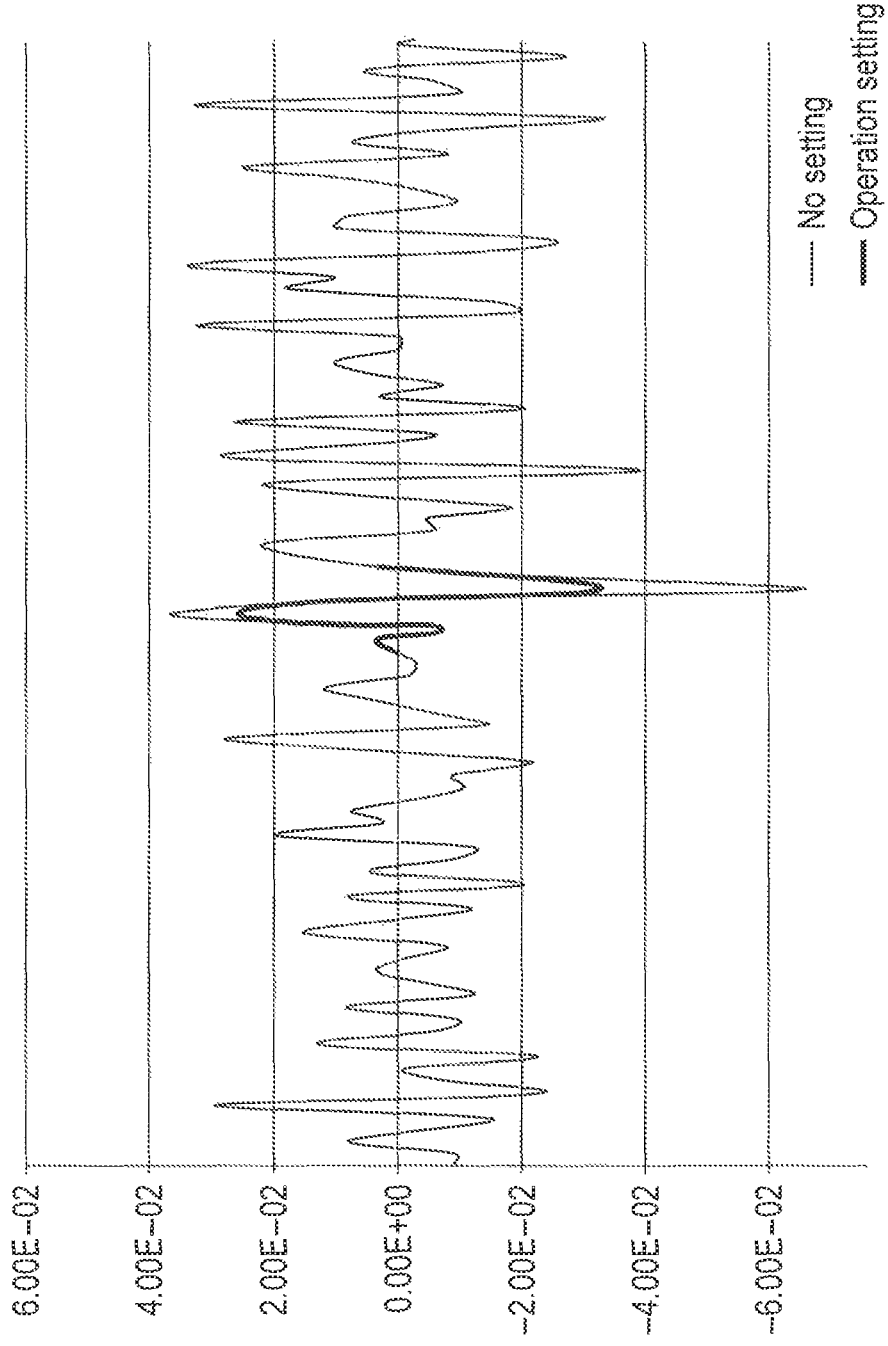
FIG. 40 is a diagram showing a relationship between a rotation angle of a crankshaft and a frictional loss in the engine unit.
Figure 42:
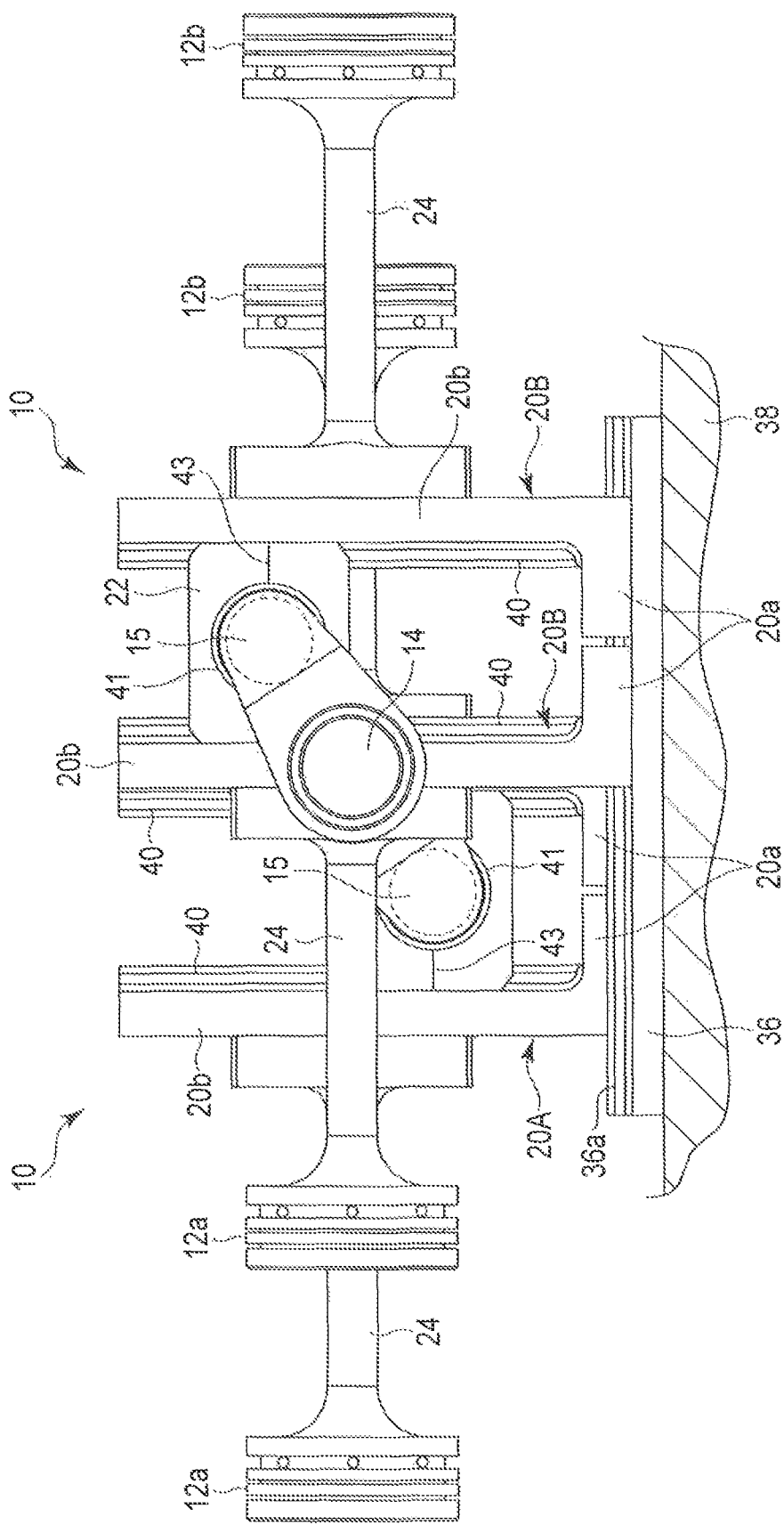
FIG. 42 is a side view showing a 4-cylinder horizontal opposed-type engine unit including the horizontally coaxial linear XY separate crank mechanism according to the other embodiment.
Figure 44:
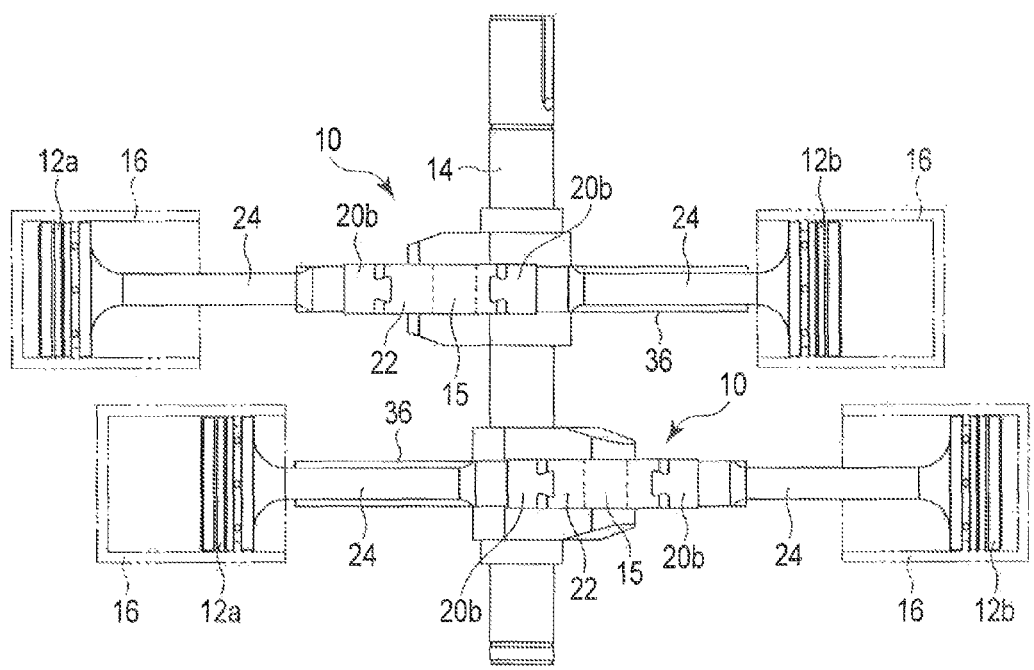
FIG. 44 is a plan view showing the 4-cylinder horizontal opposed-type engine unit.
Figure 45:
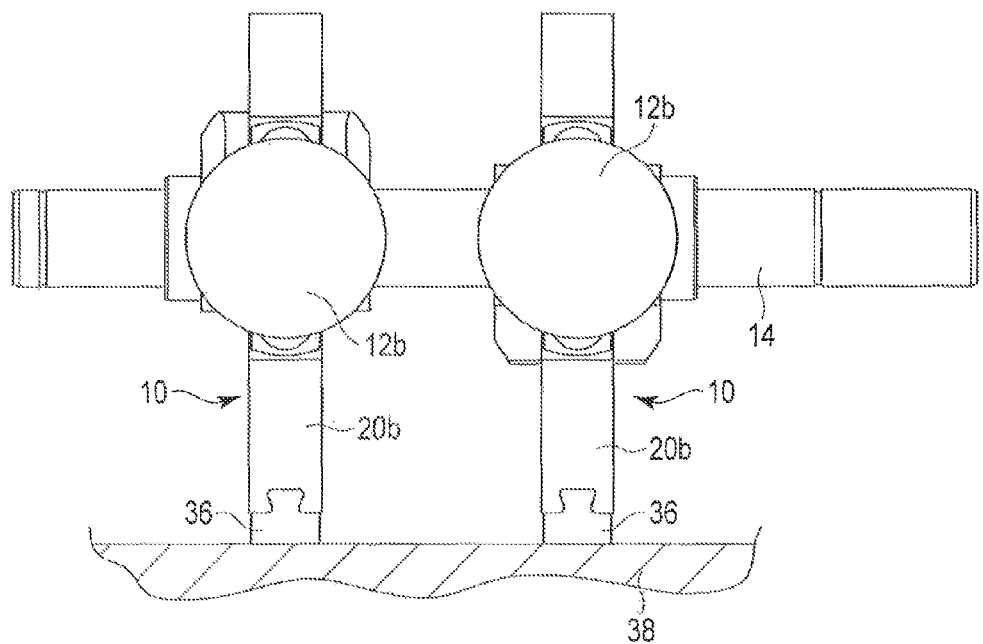
FIG. 45 is a front view showing the 4-cylinder horizontal opposed-type engine unit.

FIG. 40 shows load fluctuations of the support members 20A, 20B in accordance with the rotation angle of the crankshaft 14. It is clear that by exercising flotation control (operation setting) by means of electromagnets as described above, an increase in load generated at a specific angle can be reduced compared with a case when no flotation control (no setting) is exercised.

For a receiver operation of a compressor, vibration generator and the like, the acceleration changes due to a self weight and a switching vibration is generated when the direction of reciprocating motion changes depending on the rotation angle of a motor. In this case, pattern control such as adding braking operation servo by controlling the acceleration depending on the rotation angle in advance and then accelerating the motor is effective. In a compressor or the like, acceleration and deceleration by a servo action of the motor itself is effective. In a prime mover such as an engine, however, a vibration control action is achieved by providing an optimum current for a braking operation during magnetic flotation.

A force is transmitted in both positive and negative directions of the X-axis direction by using the both-crank connecting member 22. In the Y-axis direction, if there are a self weight of a piston system and a force deflection in the X-axis direction, frictional losses can be reduced by detecting the force deflection by a sensor and controlling electromagnets.

This is particularly effective for a 1000-mm diameter piston with an increased self weight. A cable with flexibility may be used for a large-diameter piston. A simple reciprocating motion is done for a horizontally coaxial mechanism of the XY separate crank mechanism 10 and thus, the connection cables 73, 83 are capable of all kinds of sensing without affecting the operation of the pistons. Pressure fluctuations inside the cylinder, deviation load or the like can directly be sensed and set as control data. This also suits a large-piston mechanism very well.

The above embodiments are configured so that electromagnets are provided on the slide guide side and permanent magnets are provided on the support member side, but conversely, permanent magnets may be provided on the slide guide side and electromagnets may be provided on the support member side.

When a small-diameter piston is used, permanent magnets may be provided in place of electromagnets to reduce a friction by using mutual repulsion between permanent magnets on the support member side and permanent magnets on the slide guide side.

FIG. 41 shows another embodiment applied to the driving apparatus including the horizontally coaxial linear XY separate crank mechanism, for example, the 2-cylinder coaxial horizontal opposed-type engine unit. In the present embodiment, instead of short pistons, normal-shaped pistons are used as pistons 12a, 12b. Further, the pistons 12a, 12b are formed of ceramics. A connecting member 24 is connected the pistons 12a, 12b via a piston pin 25.

A top edge 92 of a second support portion 20b of support members 20A, 20B is notched diagonally. By notching the top edge 92, the weight of materials can be reduced without providing excessive endurance to the support members 20A, 20B.

In the present embodiment, the other configuration is the same as that shown in FIGS. 36 to 38 and the same reference numerals are attached to the same units to omit a detailed description thereof.

The above coaxial horizontal opposed-type engine unit is not limited to two cylinders and may be four cylinders or six cylinders or more. FIGS. 42 to 45 show an embodiment applied to, for example, the 4-cylinder coaxial horizontal opposed-type engine unit. The engine unit includes a crankshaft 14 rotatably supported by a bearing (not shown) or the like and the crankshaft includes two crank pins 15 arranged with a phase difference of 180° from each other. These crank pins 15 are positioned eccentrically with respect to the crankshaft 14 and eccentrically rotate around the crankshaft. The engine unit includes two sets of pistons 12a, 12b provided freely reciprocatingly in the X-axis direction inside the cylinder 16. The pistons 12 of each set are arranged at both ends of the crankshaft 14 in mutually opposite directions (180°) and also arranged coaxially in the X-axis direction.

A horizontally coaxial linear XY separate crank mechanism 10 is provided between the pistons 12a, 12b of each set and the crankshaft 14 and the pistons 12a, 12b are connected to the corresponding crank pins 15 by the horizontally coaxial linear XY separate crank mechanism 10. The configuration of the horizontally coaxial linear XY separate crank mechanism 10 is the same as that of the horizontally coaxial linear XY separate crank mechanism 10 in the above-described embodiments and the same reference numerals are attached to the same units to omit a detailed description thereof. Crank connecting members 22 of the two XY separate crank mechanisms 10 are provided in parallel with each other and similarly, support members 20a, 20b are also provided in parallel with each other. The both-crank connecting members 22 in each of the XY separate crank mechanisms 10 is formed in a vertically separable state by a division surface 43 passing through a bore 41.

In an engine unit configured as described above, when a driving force by compressed and burned fuel is input to the pistons 12, the pistons 12 reciprocate. The reciprocating motion of the pistons 12 is converted into rotational motion by reciprocating motion in the X-axis direction of the support members 20A, 20B and reciprocating motion in the Y-axis direction of the both-crank connecting member 22 in the XY separate crank mechanism 10 and transmitted to the crankshaft 14. In this manner, rotational output is provided to the crankshaft 14.

In a multi-cylinder engine unit, the dimension of the engine unit in the axial direction of the crankshaft 14 can be made shorter to downsize the engine unit by arranging the two sets of the coaxial pistons 12a, 12b and the two sets of the horizontally coaxial linear XY separate crank mechanisms 10 in parallel. A multi-cylinder engine unit including the horizontally coaxial linear XY separate crank mechanisms 10 configured as described above can also be applied to compressors, pumps and the like. The above coaxial structure can easily realize a piston structure of double currents.

Figure 46:
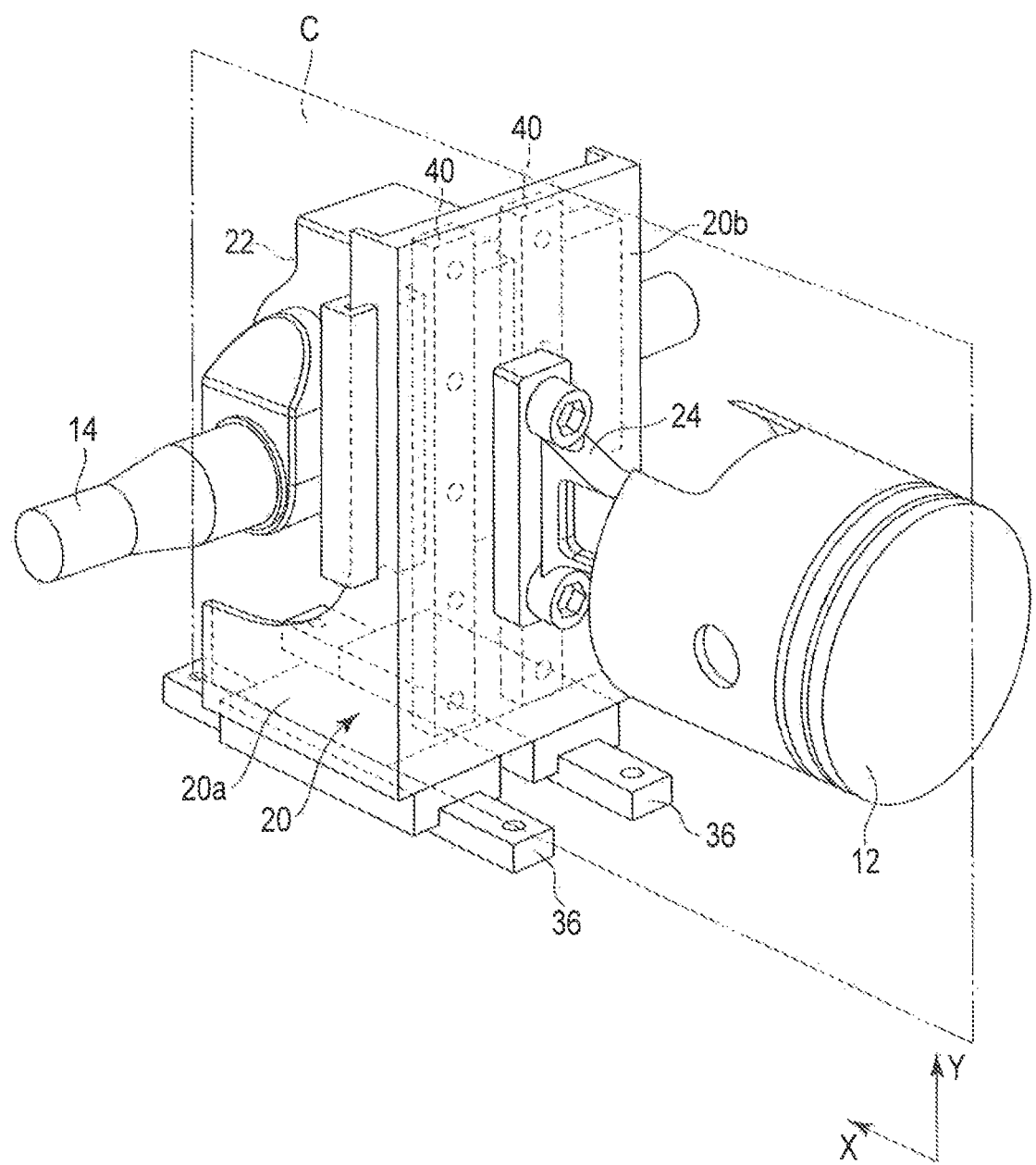
FIG. 46 is a sectional view showing the Z-mechanism XY separate crank mechanism according to still another embodiment.

Like the embodiment shown in FIG. 46, the slide guides 36 supporting the support member 20 of the XY separate crank mechanism 10 may be arranged in a plurality of rows, for example, two rows on the same plane perpendicular to the reference plane C, for example, the X-axis plane. These slide guides 36 extend each in the X-axis direction and are arranged in positions symmetric with respect to the reference plane C.

Similarly, the slide guides 40 freely reciprocatingly supporting the crank connecting member 22 on the support member 20 may be arranged in a plurality of rows, for example, two rows on the same plane perpendicular to the reference plane C, for example, the Y-axis plane. These slide guides 36 extend each in the Y-axis direction and are arranged in positions symmetric with respect to the reference plane C.

Thus, if two slide guides are used out of necessity of strength, these slide guides can be used without causing an umbrella opening loss by arranging the slide guides in the same plane.

A driving apparatus including the above XY separate crank mechanism 10 can be applied to, for example, a pressing apparatus that outputs in a direction parallel to the X-axis direction. The driving apparatus can also be used for a mechanism such as a high-speed shaper. In such a case, the vibration can effectively be canceled out by adopting a dual XY separate crank mechanism.

Figure 47:
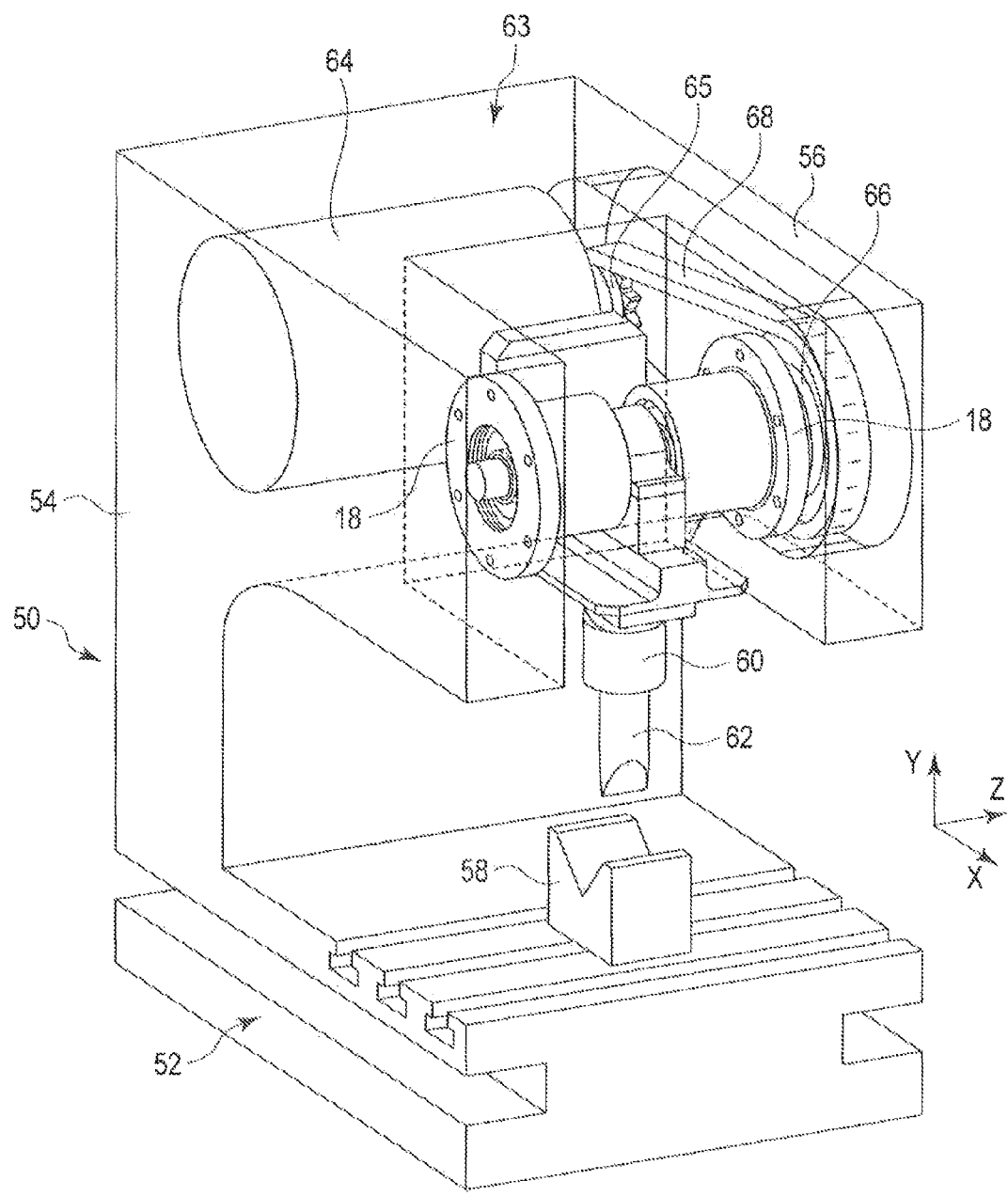
FIG. 47 is a perspective view showing a pressing apparatus including the XY separate crank mechanism according to the embodiment.

FIGS. 47 and 48 show an embodiment applied to a pressing apparatus.

As shown in FIG. 48, the pressing apparatus includes a main body frame 50 in an approximately U-shape. The main body frame 50 includes a base portion 52 extending horizontally, a projection portion 54 projecting vertically upward from the base portion, and a support portion 56 extending in parallel with the base portion 52 from a top edge of the projection portion. In addition, a working space is formed between the base portion 52 and the support portion 56. A lower die 58 movable in the Z direction is installed on the base portion 52 and is positioned in the working space.

A elevating axis 60 that can be elevated in, for example, the vertical direction, here, the Y-axis direction is supported by the support portion 56 and a press head 62 is mounted on a bottom edge of the elevating axis 60. A workpiece to be worked on is pressed by pressing the workpiece between the press head 62 and the lower die 58.

As shown in FIGS. 47 and 48, the support portion 56 is provided with a driving mechanism 63 and the Z-mechanism XY separate crank mechanism 10 that transmits a driving force of the driving mechanism to an elevating axis 21. The driving mechanism 63 includes a pulse servo motor 64 supported by the support portion 56. The driving shaft of the pulse servo motor 64 extends horizontally and a driving sprocket 65 is mounted on the tip thereof.

The crankshaft 14 is rotatably mounted on the support portion 56 via a plurality of the bearings 18. The crankshaft 14 extends approximately horizontally and in parallel with the driving shaft of the pulse servo motor 64. One end of the crankshaft 14 protrudes to the outside from the bearing 18 and a driven sprocket 66 is mounted on the one end. A toothed driving belt 68 is put between the driven sprocket 66 and the driving sprocket 65. The driven sprocket 66 has larger teeth than the driving sprocket 65. Thus, by driving the pulse servo motor 64, the crankshaft 14 is driven to rotate at a predetermined reduction gear ratio.

The support portion 56 is provided with the XY separate crank mechanism 10 that transmits a driving force of the driving mechanism to the elevating axis 60 to drive the elevating axis 60 to elevate. The XY separate crank mechanism 10 includes the L-shaped support member 20 provided freely reciprocatingly in the Y-axis direction in the reference plane C containing the center axis (movement axis) of the elevating axis 60 as a movable body, the crank connecting member 22 mounted on the support member 20 freely reciprocatingly in the X-axis direction perpendicular to the Y-axis direction in the reference plane C, and the connecting member, that is the elevating axis 60 that connects the press head 62 and the support member 20. That is, the elevating axis 60 is connected with the support member 30.

The support member 20 is formed in an L-shape and integrally includes the first support portion 20a extending in the Y-axis direction and the second support portion 20b extending in the X-axis direction from the first support portion. The first support portion 20a is freely reciprocatingly supported and guided in the Y-axis direction by the first slide guide 36. The first slide guide 36 is fixed to the support portion 56 and provided fixedly. The first slide guide 36 includes the guide rib 36a extending in the Y-axis direction and whose cross section is formed in a trapezoidal shape and a slider 36b fixed to the first support portion 20a. The slider 36b is provided with the dovetail groove 37 with which the guide rib 36a is freely slidingly engaged.

The second support portion 20b of the support member 20 is provided with the second slide guide 40 extending in the X-axis direction. The crank connecting members 22 is connected to the second slide guide 40 and is supported by the second slide guide 40 freely reciprocatingly in the X-axis direction. The crank connecting member 22 is provided in the reference plane C and connected to the crankshaft 14. That is, the circular bore 41 is formed in the crank connecting member 22 and the crank pin 15 of the crankshaft 14 is rotatably inserted through the bore 41 via a slide bearing. Accordingly, the crank connecting member 22 is engaged with the crankshaft 14 to connect the crankshaft 14 and the support member 20.

The top edge of the elevating axis 60 as a connecting member is fixed to the second support portion 20b of the support member 20. Accordingly, the elevating axis 60 extends in the Y-axis direction in the reference plane C. The elevating axis 60 reciprocates integrally with the support member 20 in the Y-axis direction.

In the pressing apparatus configured as described above, if the crankshaft 14 rotates after a turning effort being input to the crankshaft 14 by the pulse servo motor 64, the crank pin 15 rotates eccentrically around the crankshaft 14. The motion of the eccentric rotation is separated into movement in the X-axis direction and movement in the Y-axis direction by the crank connecting member 22 and the support member 20 of the XY separate crank mechanism 10, the crank connecting member 22 is caused to reciprocate by the second slide guide 40 in the X-axis direction, and the support member 20 is caused to reciprocate by the first slide guide 36 in the Y-axis direction together with the crank connecting member 22. The reciprocating motion of the support member 20 in the Y-axis direction is transmitted to the elevating axis 60 and the press head 62 and the elevating axis 60 and the press head 62 reciprocate in the Y-axis direction. In this manner, rotational motion of the crankshaft 14 is transmitted to the press head 62 after the rotational motion being converted into reciprocating motion by each of the XY separate crank mechanisms 10. Accordingly, the press head 62 is pushed down toward the lower die 58 to press a workpiece to be worked on placed between the press head and the lower die 58.

According to the pressing apparatus configured as described above, a pressing reaction force is not added to the XY separate crank mechanism 10 and instead transmitted to the base portion 52. Thus, the XY separate crank mechanism 10 has sufficient durability when viewed in the light of structure. Like the embodiment described above, the XY separate crank mechanism 10 can significantly reduce frictional losses and accordingly, the size of a driving mechanism such as a motor can be reduced and also the size of a whole apparatus containing the XY separate crank mechanism can be reduced. Moreover, there is no frictional loss, which leads to low vibration and enables a high-speed operation.

Figure 49:
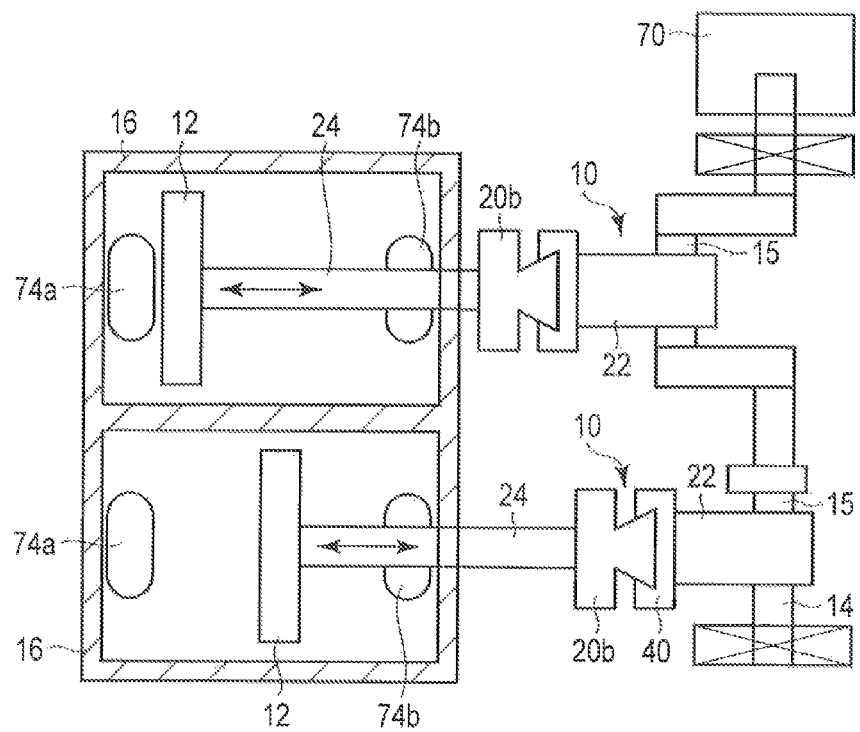
FIG. 49 is a perspective view showing the pressing apparatus including the XY separate crank mechanism according to the embodiment.
Figure 50:
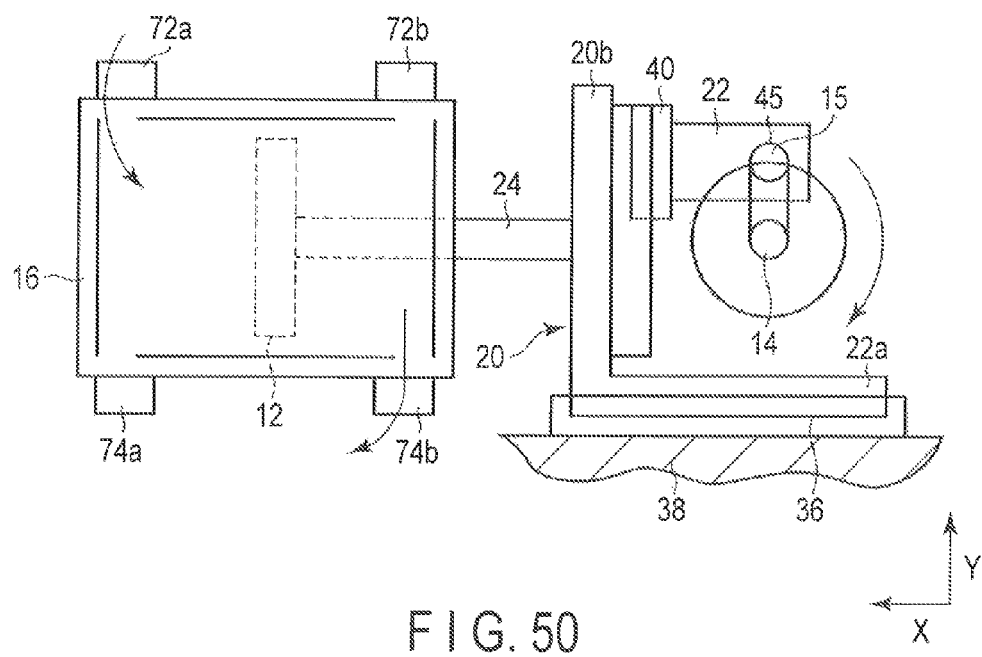
FIG. 50 is a side view of the pump.

FIGS. 49 and 50 show an embodiment in which a driving apparatus is applied to a double-acting piston type pump.

As shown in FIGS. 49 and 50, the pump includes, for example, the crankshaft 14 extending in the horizontal direction. The crankshaft 14 is rotatably supported by a pair of the bearings 18 and one end thereof is connected to a motor 70 as a driving source. The crankshaft 14 includes the two crank pins 15 arranged with the phases being mutually shifted by a predetermined angle, for example, 90°. These crank pins 15 are positioned eccentrically with respect to the crankshaft 14 and eccentrically rotate around the crankshaft.

The pump also includes the two blocked parallel cylinders 16 and the two pistons 12 provided freely reciprocatingly in the X-axis direction inside these cylinders 16 and the direction of movement (X-axis direction) of these pistons 12 are provided in two reference planes that are each perpendicular to the crankshaft 14 and also mutually in parallel with clearance therebetween.

Stream inlets 72a, 72b are formed in upper parts of both ends of each of the cylinders 16 and stream outlets 74a, 74b are formed in lower parts of both ends of the cylinders 16. The piston 12 reciprocates between the two stream inlets 72a, 72b and between the two stream outlets 74a, 74b.

The Z-mechanism XY separate crank mechanism 10 is provided between each of the pistons 12 and the crankshaft 14. Each of the Z-mechanism XY separate crank mechanisms 10 includes the support member 20 provided freely reciprocatingly in the X-axis direction in the reference plane containing the center axis (movement axis) of the piston 12, the crank connecting member 22 mounted on the support member 20 freely reciprocatingly in the Y-axis direction perpendicular to the X-axis direction in the reference plane, and the connecting member 24 that connects the piston 12 and the support member 20.

The support member 20 is formed in an L-shape and integrally includes the first support portion 20a extending in the X-axis direction and the second support portion 20b extending in the Y-axis direction from the first support portion. The first support portion 20a is freely reciprocatingly supported and guided in the X-axis direction by the first linear slider 36. The first linear slider 36 is fixed to the base 38 and provided fixedly.

The second linear slider 40 extending in the Y-axis direction is mounted on the second support portion 20b of the support member 20. The crank connecting member 22 is formed, for example, in a plate shape and one end thereof is freely reciprocatingly supported by the second linear slider 40 in the Y-axis direction. The crank connecting member 22 is provided in the reference plane and the other end thereof is connected to the crankshaft 14. The circular bore 41 is formed at the other end of the crank connecting member 22 and the crank pin 15 of the crankshaft 14 is rotatably inserted through the bore 41 via a slide bearing. Accordingly, the crank connecting member 22 is engaged with the crankshaft 14 to connect the crankshaft 14 and the support member 20.

The connecting member 24 is configured as, for example, an elongated connecting rod, one end thereof is connected to the piston 12, and the other end thereof is connected to the second support portion 20b of the support member 20. The connecting member 24 extends coaxially with the center axis (movement axis) of the piston 12. The connecting member 24 reciprocates integrally with the piston 12 and the support member 20 in the X-axis direction.

The XY separate crank mechanism 10 disposed between the other piston 12 and the crankshaft 14 also has a configuration similar to the above configuration.

In the pump configured as described above, if the crankshaft 14 rotates after a turning effort being input to the crankshaft 14 by, for example, the motor 70, a plurality of the crank pins 15 rotates eccentrically around the crankshaft 14. The motion of the eccentric rotation is separated into movement in the X-axis direction and movement in the Y-axis direction by the crank connecting member 22 and the support member 20 of the XY separate crank mechanism 10, respectively, the crank connecting member 22 is caused to reciprocate by the second linear slider 40 in the Y-axis direction, and the support member 20 is caused to reciprocate by the first linear slider 36 in the X-axis direction together with the crank connecting member 22. The reciprocating motion of the support member 20 in the X-axis direction is transmitted to the piston 12 via the connecting member 24 and the piston 12 reciprocates inside the cylinder 16 in the X-axis direction. In this manner, rotational motion of the crankshaft 14 is transmitted to the piston 12 after the rotational motion being converted into reciprocating motion by each of the XY separate crank mechanisms 10.

With the piston 12 reciprocating inside the cylinder 16, for example, with the piston 12 moving to, water is sucked into the cylinder 16 from the stream inlet 72b and at the same time, water inside the cylinder is supplied as a pressurized fluid to the outside from the stream outlet 74a. Also, with the piston 12 moving back, water is sucked into the cylinder 16 from the stream inlet 72a and at the same time, water inside the cylinder is supplied as a pressurized fluid to the outside from the stream outlet 74b.

According to the pump configured as described above, the pump performs a low-vibration operation due to the crankshaft shifted by 90 degrees and an influence of upper and lower dead points can be eliminated by the operation of every 90 degrees. Like the embodiment described above, the XY separate crank mechanism 10 can significantly reduce frictional losses and accordingly, the size of a driving source such as a motor can be reduced and also the size of a whole apparatus containing the XY separate crank mechanism can be reduced. Moreover, there is no frictional loss, which leads to low vibration and enables a high-speed operation.

According to the above various embodiments, as described above, an XY separate crank capable of reducing frictional losses and vibration and transmitting motion with high efficiency and a driving apparatus including the XY separate crank can be provided.

The present invention is not limited to the above embodiments as they are and may be embodied by modifying elements without deviating from the scope thereof in the stage of working. Also, various inventions may be formed by appropriately combining a plurality of elements disclosed by the above embodiments. For example, some elements may be removed from all elements shown in an embodiment. Further, elements contained in different embodiments may appropriately be combined.

What is claimed is:

1. An XY separate crank mechanism provided between a movable body for reciprocating in a first direction and a rotatable crankshaft to mutually convert reciprocating motion of the movable body and rotational motion of the crankshaft, comprising:
   a support member formed in an L-shape, comprising a first support portion extending in the first direction and a second support portion extending in a second direction perpendicular to the first direction from the first support portion, wherein only the first support portion is supported to freely reciprocate in the first direction by a first slider extending in the first direction;
   a crank connecting member comprising an end portion, only the end portion of the crank connecting member being mounted on the second support portion of the support member to freely reciprocate in the second direction by a second slider extending in the second direction and a crank pin of the crankshaft rotatably engaged with the crank connecting member; and
   a connecting member connecting the movable body and the second support portion of the support member and configured to reciprocate in the first direction together with the movable body and the support member, wherein
   the support member, the crank connecting member, and the connecting member are provided movably in a reference plane containing a movement axis of the movable body.

2. The XY separate crank mechanism according to claim 1, wherein the crank pin of the crankshaft is inserted into the crank connecting member and rotatably supported by the crank connecting member.

3. The XY separate crank mechanism according to claim 2, wherein the crankshaft extends in a direction perpendicular to the reference plane.

4. The XY separate crank mechanism according to claim 3, wherein the connecting member is arranged coaxially with the movement axis of the movable body.

5. The XY separate crank mechanism according to claim 1, wherein the first support portion of the support member comprises a dovetail groove extending in the first direction and the first direction slider is slidably engaged with the dovetail groove.

6. The XY separate crank mechanism according to claim 1, wherein the support member comprises a third support portion extending from the first support portion in the second direction and opposing the second support portion with a distance, and
   which further comprises another movable body freely reciprocating in the first direction and another connecting member connecting the third support portion and the other movable body.

7. A driving apparatus comprising:
   a piston provided in a cylinder to freely reciprocate in a first direction;
   a crankshaft extending in a direction perpendicular to a reference plane containing a movement axis of the piston in the first direction; and
   the XY separate crank mechanism according to claim 1 provided between the piston and the crankshaft to mutually convert reciprocating motion of the piston and rotational motion of the crankshaft.

8. The driving apparatus according to claim 7, wherein the support member and the crank connecting member of the XY separate crank mechanism are formed in shapes and dimensions to be accommodated in a region between a rotation region of the crankshaft and a movement region of the piston.

9. The driving apparatus according to claim 8, which is configured as an engine unit that compresses and burns fuel inside the cylinder.

10. The driving apparatus according to claim 8, which comprises a driving section configured to rotate the crankshaft, wherein the driving apparatus is configured as a compressor configured to supply a compressed fluid from the cylinder.

11. An XY separate crank mechanism provided between a movable body for reciprocating in a first direction and a rotatable crankshaft to mutually convert reciprocating motion of the movable body and rotational motion of the crankshaft, comprising:

a support member provided to freely reciprocate in the first direction, the support member comprising a first support portion extending in the first direction and two second support portions extending in opposite directions from the first support portion in a second direction perpendicular to the first direction;

two crank connecting members mounted on the two second support portions slidably in the second direction and each rotatably engaging with the crankshaft; and a connecting member connecting the movable body and the support member and configured to reciprocate in the first direction together with the movable body and the support member, wherein the support member, the crank connecting member, and the connecting member are provided movably in a reference plane containing a movement axis of the movable body.

* * * * *